(12) United States Patent
Soar

(10) Patent No.: US 8,791,600 B2
(45) Date of Patent: Jul. 29, 2014

(54) VEHICLE SEAT INDUCTIVE CHARGER AND DATA TRANSMITTER

(76) Inventor: Roger J. Soar, Kelowna (CA)

( * ) Notice: Subject to any disclaimer, the term of this patent is extended or adjusted under 35 U.S.C. 154(b) by 841 days.

(21) Appl. No.: 12/923,594

(22) Filed: Sep. 29, 2010

(65) Prior Publication Data

US 2011/0018498 A1 Jan. 27, 2011

Related U.S. Application Data

(63) Continuation-in-part of application No. 11/922,788, filed on Dec. 21, 2007, now Pat. No. 7,863,859.

(60) Provisional application No. 61/272,491, filed on Sep. 30, 2009.

(51) Int. Cl.
*H01F 27/42* (2006.01)
*H01F 37/00* (2006.01)
*H01F 38/00* (2006.01)
*H02J 7/00* (2006.01)

(52) U.S. Cl.
USPC .......................................... 307/104; 320/108

(58) Field of Classification Search
USPC .......................................... 307/104; 320/108
See application file for complete search history.

(56) References Cited

U.S. PATENT DOCUMENTS

| | | | |
|---|---|---|---|
| 5,264,776 A | 11/1993 | Hulsey | |
| 5,542,807 A * | 8/1996 | Kruzick | 414/491 |
| 5,550,452 A | 8/1996 | Shirai et al. | |
| 5,923,544 A * | 7/1999 | Urano | 363/22 |
| 5,959,433 A | 9/1999 | Rohde | |
| 6,301,128 B1 | 10/2001 | Jang et al. | |
| 6,356,052 B2 | 3/2002 | Koike | |
| 6,388,422 B1 | 5/2002 | Lew | |
| 6,476,581 B2 | 11/2002 | Lew | |
| 6,490,176 B2 | 12/2002 | Holzer et al. | |
| 6,657,351 B2 * | 12/2003 | Chen et al. | 310/171 |
| 6,906,495 B2 | 6/2005 | Cheng et al. | |
| 6,960,968 B2 | 11/2005 | Odendall et al. | |
| 7,076,206 B2 * | 7/2006 | Elferich et al. | 455/41.1 |
| 7,462,951 B1 | 12/2008 | Baarman | |

(Continued)

FOREIGN PATENT DOCUMENTS

| | | |
|---|---|---|
| EP | 1610439 | 12/2005 |
| WO | WO 00/16493 | 4/2000 |

OTHER PUBLICATIONS

U.S. Appl. No. 10/733,221, Boateng.
U.S. Appl. No. 10/975,096, Tso.

*Primary Examiner* — Rexford Barnie
*Assistant Examiner* — Rasem Mourad
(74) *Attorney, Agent, or Firm* — Antony C. Edwards

(57) ABSTRACT

A vehicle seat inductive charger and data transmitter system includes: a vehicle seat having a first inductive coil, apparel having therein a second inductive coil, a first charging and controlling circuit cooperating with the first inductive coil, and adapted to energize and modulate the first inductive coil to transfer power and data to the second inductive coil solely via inductive coupling between the first and second inductive coils, a second charging and control circuit on the apparel cooperating with the second inductive coil, at least one main battery adapted for wearing by the user, where the main battery is adapted for charging by the second circuit upon the inductive coupling of the first and second inductive coils when energized.

30 Claims, 12 Drawing Sheets

(56) References Cited

U.S. PATENT DOCUMENTS

| | | |
|---|---|---|
| 7,612,528 B2 | 11/2009 | Baarman et al. |
| 7,728,551 B2 * | 6/2010 | Reed et al. .................... 320/108 |
| 7,999,417 B2 * | 8/2011 | Kato et al. .................... 307/149 |
| 8,169,185 B2 * | 5/2012 | Partovi et al. ................. 320/108 |
| 8,385,822 B2 * | 2/2013 | Chatterjee et al. ........... 455/41.1 |
| 2002/0154518 A1 | 10/2002 | Elferich et al. |
| 2004/0145342 A1 | 7/2004 | Lyon |
| 2004/0145343 A1 | 7/2004 | Naskali et al. |
| 2004/0189246 A1 | 9/2004 | Bulai et al. |
| 2004/0232845 A1 | 11/2004 | Baarman et al. |
| 2005/0017958 A1 | 1/2005 | Silverbrook et al. |
| 2005/0127866 A1 * | 6/2005 | Hamilton et al. ............. 320/108 |
| 2006/0087282 A1 | 4/2006 | Baarman et al. |
| 2008/0079388 A1 | 4/2008 | Sarnowsky et al. |
| 2008/0116847 A1 * | 5/2008 | Loke et al. .................... 320/108 |
| 2010/0090491 A1 | 4/2010 | Hipshier et al. |
| 2010/0201201 A1 | 8/2010 | Mobarhan et al. |

* cited by examiner

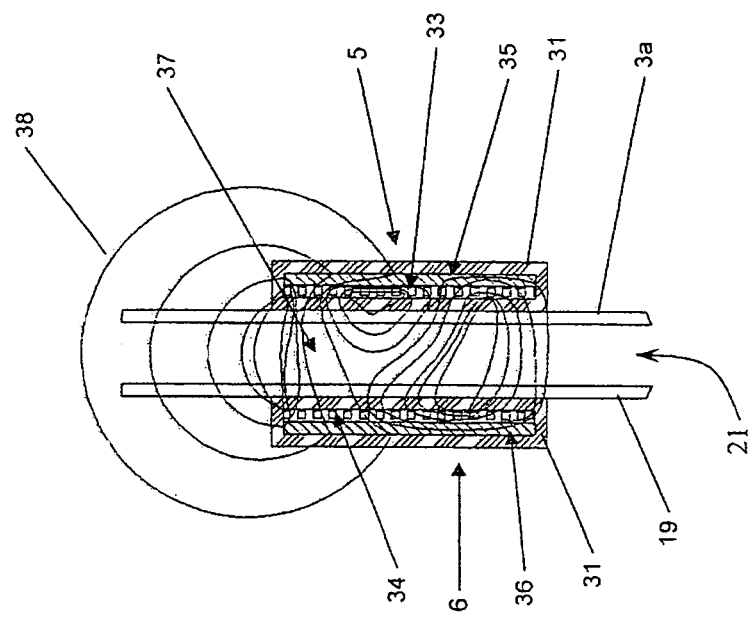
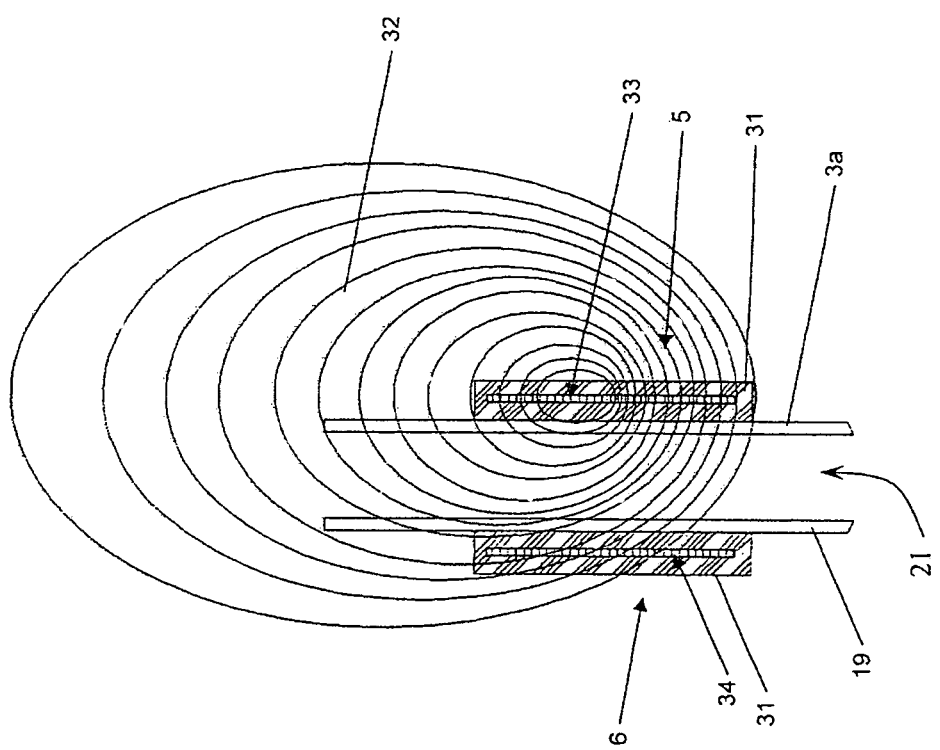

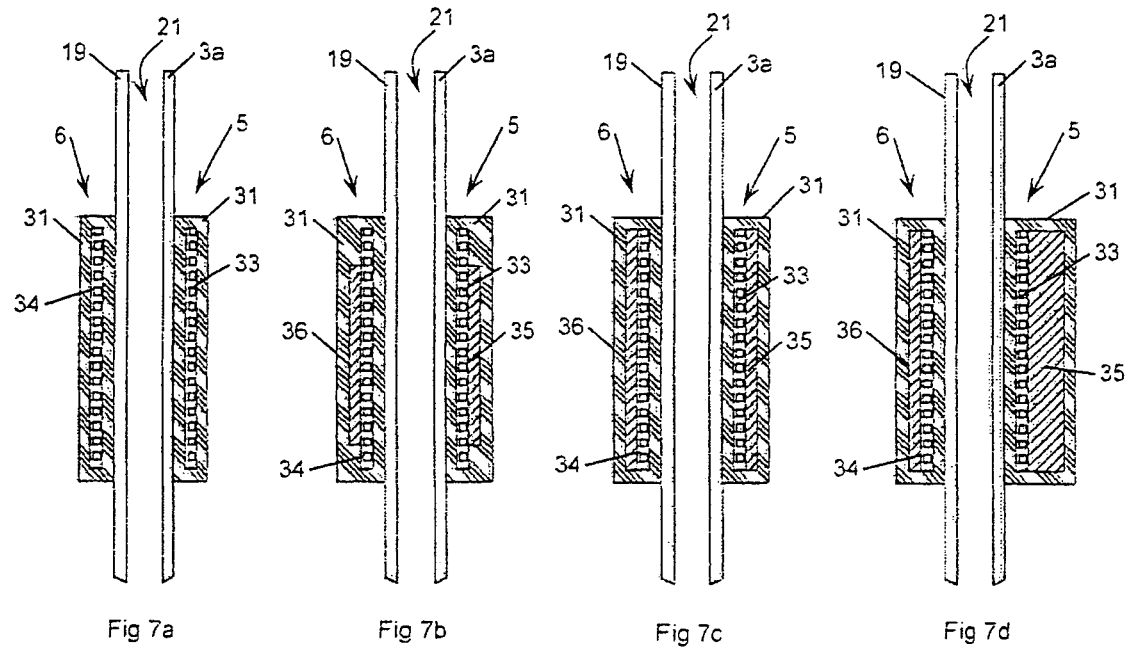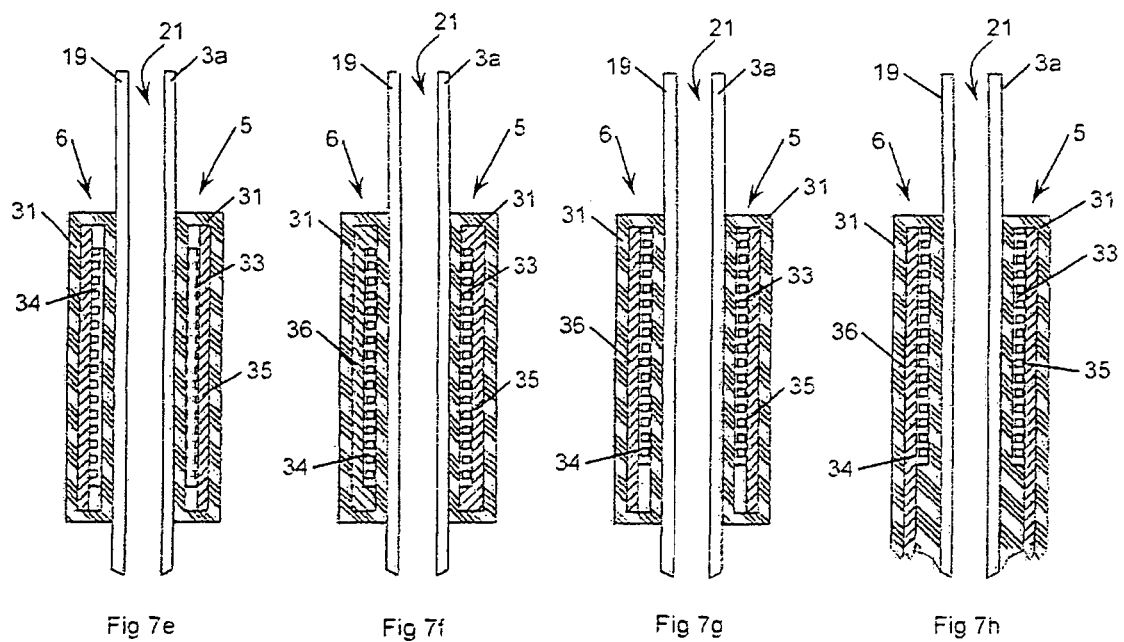

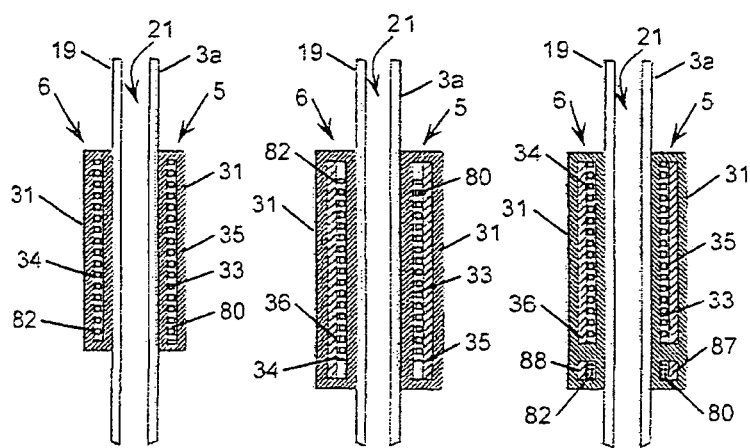
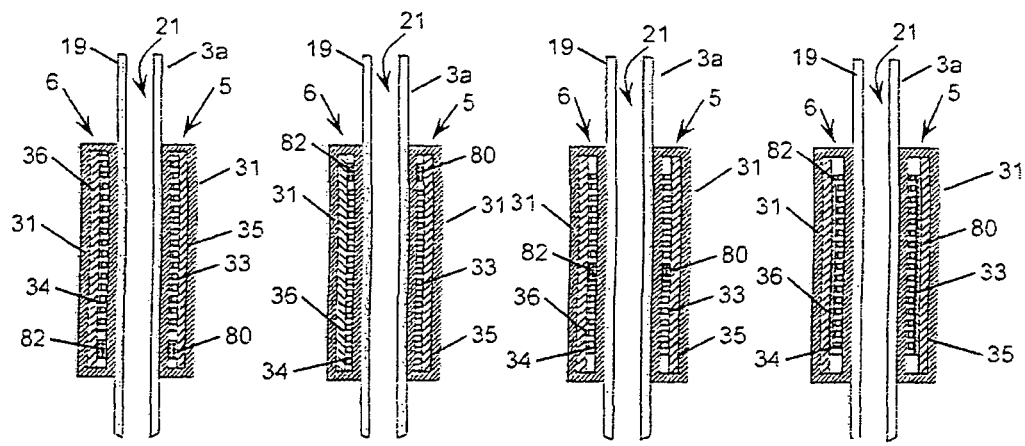

VEHICLE SEAT INDUCTIVE CHARGER AND DATA TRANSMITTER

CROSS REFERENCE TO RELATED APPLICATION

This application is a continuation-in-part from the U.S. patent application Ser. No. 11/922,788 entitled Contactless Battery Charging Apparel, and also claims priority from U.S. Provisional Patent Application No. 61/272,491 filed Sep. 30, 2009 entitled Inductive Charging Vehicle Seat.

FIELD OF THE INVENTION

This invention relates to the field of devices for contactless inductively-coupled charging of batteries and inductive transfer of data including communications where the battery is worn by a user and the charging and communication occurs while the user is sitting or laying in a vehicle seat containing the primary inductive coil, the secondary inductive coil also being worn by the user is sitting or laying.

BACKGROUND OF THE INVENTION

In applicant's view, the personal power requirements of the soldier or Marine (hereinafter collectively referred to as a solider) continue to increase at a relatively rapid rate. The requirements for improved power management, power distribution and reduced weight of batteries that must be by the solider was, inter alia, the subject of my PCT Application No. PCT/CA2006/001078 for Contactless Battery Charging Apparel filed Jun. 28, 2006, incorporated herein by reference, that describes the application of multiple inductive charging nodes distributed around the torso of the soldier, that are able to provide power through inductive coupling to equipment on the soldiers torso, weapons subsystem and helmet subsystem.

An important component of this system is the utilisation of a central power source that could be any of several technologies including primary batteries, rechargeable (secondary) batteries or fuel cells. Most soldier modernisation system designs favour that of rechargeable batteries as the central power source. The central battery could be swapped out and be replaced by another battery that is fully recharged. There is also the option for charging the central battery while it is still being utilised and carried by the soldier. A unique opportunity to recharge the battery presents itself when the soldier is being transported by a vehicle such as LAV, HMMV, an ATV, or any other military vehicle that provides both seats for occupants and a power source for charging.

The need to charge the electronic equipment on a modernised solider has been recognised since the original concept of modernised soldier systems. The use of primary batteries as a central power source has proven to be very poor option in terms of extra weight carried by the soldier, logistic support, etcetera. The provision of a rechargeable central power source to the soldier provides several options to input power when separated from barracks or forward operating base charging facilities. These options would include solar power, energy harvesting, AC recharging and the ability to access vehicle, aircraft or marine transport electric power.

Power from transportation could be as simple as swapping out a depleted battery (or the depleted components of a battery) for a fully charged battery (or fully charged components of a battery), or placing a charge into the battery once within the transport.

The existing Stryker Integration Kit (VIK) provides the soldier when seated with an umbilical connection for DC power and communications with the vehicle crew. The energy provided by the umbilical connection directly powers both the Land Warrior system and the charging of the main batteries. This connection is not without problems as it has been determined it is not only difficult for soldiers to connect to the vehicle but that a failure of the AN/PSN-11 GPS PLGR has been linked to improper connections of the umbilical wiring harness to the host vehicle.

As applicant understands it, a primary objective of current US Army Land Warrior research is to examine the potential for increasing the ruggedness, decreasing the cost and or weight of the system by improving the electrical connectors and cable/connector assemblies in the Land Warrior ensemble. This will also benefit any future combat soldier, such as Future Force Warrior (FFW) and Ground Soldier System (GSS), to which some of these improvements could potentially apply.

It is applicant's opinion that the existing round plug-ins for the cables on the Land Warrior's computer are bulky, costly, and prone to failure because pin-and-socket connections are less than robust. Existing connectors have a low life expectancy and exhibit failures of the connector pins and sockets. The Land Warrior system being fielded today consists of 40 connectors, including both the plugs on the cables and the receptacles.

Although there are in the prior art examples of inductive charging being used in-conjunction with vehicles, to the best of applicant's knowledge none describe where batteries worn on the body of an occupant are charged by the transfer of power inductively or that data or communications is transferred inductively between the occupant and the vehicle or vehicle seat. Hulsey (U.S. Pat. No. 5,264,776) and Koike (U.S. Pat. No. 6,356,052) are representative of patents for the transfer of electrical power to a vehicle for the purpose of safely charging on board drive batteries of either electric or hybrid powered vehicles from a AC power source. The other inductive technology application that has seen more interest recently is the use of inductive coupling to transfer power and data between personal hand held devices such as cellular phones, MP3 player, PDA, GPS etc that are stowed in the vehicles console or dashboard. See for example Hipshier (US Publication No. 2010/0090491 A1), or Sarnowsky (US Publication No. 2008/0079388 A1) Baarman (U.S. Pat. No. 7,462,951) describes the charging of power tools and other commercial devices within tool boxes or caddies located within the cab or box of a truck. Reed (U.S. Pat. No. 7,728, 551 B2) teaches placing a primary inductive circuit in the vehicle seat back however it then inductively connects to a visible surface containing the rechargeable device. Baarman (U.S. Pat. No. 7,612,528 B2) also teaches placing a primary inductive circuit in a vehicle seat back which is a remote device holder and into which a device is placed. It does not teach the inductive transfer of power to a person's torso for the purpose of charging centralized batteries to power a soldier system.

With respect to prior art for inductive data transfer there is a significant body of work that has been documented on both the passive and active transfer of data with respect to inductively coupled RFID devices. To the best of the applicants knowledge none describe where data is passed inductively from a vehicle seat to receiving devices on the occupant of the seat. Lair (U.S. Pat. No. 7,149,552 B2) and Palermo (U.S. Pat. No. 7,254,366 B2) are both representative of the transfer of data using near field inductive technology however both regard the transfer of audio data between a communication radio and hand or head sets.

SUMMARY OF THE INVENTION

In summary, the Vehicle Seat Inductive Charger and Data Transmitter according to one aspect of the present invention may be characterized as including a system for providing a user, while seated in a vehicle seat in a vehicle, with electrical power and data communication without the use of a physical electrical connection between the user and the seat or vehicle, where the system includes:

a) a vehicle seat having a first inductive coil assembly, where the seat is adapted to be mounted in the vehicle,
b) apparel having therein a second inductive coil assembly, where the apparel is adapted to be worn by the user,
c) first electronics adapted for mounting in the vehicle and cooperating with the first inductive coil assembly, where the first electronics is a first charging and controlling circuit adapted to energize and modulate a first inductive coil of the first inductive coil assembly, and where the first inductive coil is adapted to transfer power and data to a second inductive coil of the second inductive coil assembly solely via inductive coupling between the first and second inductive coils,
d) second electronics on the apparel and cooperating with the second inductive coil assembly, where the second electronics is a second charging and control circuit,
e) at least one main battery assembly adapted for wearing by the user, where the main battery assembly or assemblies each include at least one main battery and are adapted for charging of the batteries by the second electronics upon the inductive coupling between the first and second inductive coils when energized.

The power for the energizing and charging is transferred solely via the inductive coupling from the first electronics and first inductive coil to the second inductive coil and the second electronics and data is transferred via the modulations of the inductive coils for data communications between the first and second electronics.

Where the apparel is torso-covering apparel, the first inductive coil may be positioned on a seat back of the seat, and the second inductive coil may be located on a back portion of the torso-covering apparel. The first inductive coil may be selectively positionable on the seat back to correlate the position of the first inductive coil with the location of the second inductive coil on the back portion of the apparel. The seat back may be flexible and the first inductive coil may be at least in part, correspondingly flexible. The first and/or second inductive coils and, where applicable, the corresponding ferrite backing may be segmented to provide the flexibility. The second inductive coil may be flexible for substantially conformal, substantially parallel alignment of the first and second inductive coils when the user is sitting in the seat with the back portion of the apparel against the seat back. Alternatively or additionally the first inductive coil may be contoured so as to substantially conform in shape to the user's torso. A sleeve having a first inductive coil mounted therein may be used for retrofitting seat backs, where the sleeve is sized to fit over the seat back. A hoist may be mounted in the sleeve. The hoist is mounted to the first inductive coil, and is adapted to selectively vertically position the first inductive coil within the sleeve.

In one embodiment the system may further include electrically powered small devices for carrying by the user in inductively coupled proximity to the apparel. The small devices have secondary batteries for electrical operation of the small devices. The apparel has at least one small-device charging primary inductive coil. The small devices include secondary coils positioned and adapted for charging of the secondary batteries when the secondary coils are in charging proximity to the small-device-charging primary inductive coil. The small-device-charging primary inductive coil is positioned on the apparel so as to transfer electrical power to the secondary coils when corresponding small devices are carried by the user and the small-device-charging primary inductive coil is energized.

In a further embodiment the first inductive coil assembly includes a plurality of first inductive coils mounted to the seat, and the first electronics includes a plurality of first electronics corresponding to and cooperating with the plurality of the first inductive coils. Consequently, in this embodiment the second inductive coil assembly includes a corresponding plurality of second inductive coils positioned to correspond to the plurality of first inductive coils.

In a preferred embodiment the first and second inductive coils are each encapsulated within an environmentally resistant encapsulation. The encapsulation may be polymer encapsulation the environmentally resistant encapsulation at a minimum water-proof.

The inductive coupling forms an air core between the first and second inductive coils. In one embodiment the inductive coils each have a ferrite backing. Advantageously, the ferrite backing is positioned relative to the coils so as to increase inductive efficiency within the inductive coupling by minimizing stray flux and increasing flux density across the air core.

In one embodiment the seat includes a metal frame and the first electronics is mounted to the metal frame so as to provide a heat sink for the first electronics. The second electronics may be mounted adjacent the second inductive coil, for example may be mounted within the second inductive coil, and so as to be substantially co-planar therewith.

Further advantageously a proximity sensor is provided cooperating between the first and second inductive coils so that a coupling proximity of the first inductive coil to the second inductive coil, so as to allow the inductive coupling, is detected by the proximity sensor. The proximity sensor may be adapted to communicate a trigger to the first electronics upon attaining the coupling proximity. The first electronics may be adapted to only energize the first inductive coil upon receiving the trigger. The proximity sensor may include a first element adjacent the first inductive coil and a second element adjacent the second inductive coil. The first and second elements cooperate to generate the trigger. The first element may be a hall effect sensor and the second element may be a magnet.

The main battery assembly or assemblies may each include a battery charging and control circuit adapted to monitor charging required by the corresponding main battery and to correspondingly charge the main battery as required upon the inductive coupling. If the battery charging and control circuit determines no charging of the main battery is required then a corresponding battery status may be communicated to the first electronics and the power transfer via the inductive coupling may be terminated by the first electronics. The first electronics may be adapted to interrogate the second electronics upon the inductive coupling to determine the charging required by the main battery or batteries.

The first and second inductive coils may include, respectively: a first power transfer coil and a separate first data transfer coil; and, a second power transfer coil and a separate second data transfer coil. The first and second data transfer coils may be embedded in, respectively, the first and second power transfer coils. Where the first and second inductive coils each have a ferrite backing, the first and second data transfer coils may be interleaved with, respectively, the first and second power transfer coils and the ferrite backings. The first and second data transfer coils may be non-concentric with the first and second power transfer coils respectively. The first and second data transfer coils may be spaced apart from the first and second power transfer coils respectively. The first power transfer coil and the first data transfer coil may be substantially co-planar.

The present invention includes a method corresponding to the system summarized above. The method is for providing a user, while seated in a vehicle seat in a vehicle with electrical power and data communication without the use of a physical electrical connection between the user and the seat or vehicle. The method includes:

a) providing a vehicle seat having a first inductive coil assembly, where the seat is adapted to be mounted in a vehicle, b) providing apparel having therein a second inductive coil assembly, where the apparel is adapted to be worn by the user, c) providing first electronics adapted for mounting in the vehicle and cooperating with the first inductive coil assembly, where the first electronics includes a first charging and controlling circuit adapted to energize and modulate a first inductive coil of the first inductive coil assembly, and where the first inductive coil is adapted to transfer power and data to a second inductive coil of the second inductive coil assembly solely via inductive coupling between the first and second inductive coils, d) providing second electronics on the apparel and cooperating with the second inductive coil assembly, where the second electronics includes a second charging and control circuit, e) providing at least one main battery assembly adapted for wearing by the user, where each main battery assembly includes at least one main battery and is adapted for charging of each main battery by the second electronics upon the inductive coupling between the first and second inductive coils when energized, f) transferring, solely via the inductive coupling, power for energizing of the second inductive coil and charging of each main battery from the first electronics to the second electronics and data via the modulations of the coils for data communications between the first and second electronics.

Where the apparel is torso-covering apparel, the method may further include providing the first inductive coil on a seat back of the seat, and providing the second inductive coil on a back portion of the torso-covering apparel.

The method may further include is selectively positioning a position of the first inductive coil on the seat back to correlate the position with a location of the second inductive coil on the back portion of the apparel. As stated above, the seat back may be flexible and the first inductive coil may be at least in part correspondingly flexible. The first and/or second inductive coil may be segmented to provide the flexibility. The second inductive coil may be flexible for substantially conformal, substantially parallel alignment of the first and second inductive coils when the user is sitting in the seat with the back portion of the apparel against the seat back. The first inductive coil may be contoured so as to substantially conform in shape to the user's torso.

The method may further include:

g) providing electrically powered small devices for carrying by the user in inductively coupled proximity to the apparel, the small devices having secondary batteries for electrical operation of the small devices, the apparel having at least one small device charging primary inductive coil, h) and further providing the small devices with secondary coils positioned and adapted for charging of the secondary batteries when the secondary coils are in charging proximity to the small device charging primary inductive coil, i) positioning the small device charging primary inductive coil on the apparel so as to transfer electrical power to the secondary coils when corresponding the small devices are carried by the user and the small device charging primary inductive coil is energized.

The method may further include providing a sleeve having the first inductive coil mounted therein and fitting the sleeve over the seat back, and may further include providing a hoist in the sleeve, wherein the hoist is mounted to the first inductive coil, the hoist adapted to position the first inductive coil into the position.

The method may further include providing a plurality of the first inductive coils mounted to the seat, and providing corresponding first electronics cooperating with the plurality of first inductive coils, and providing a corresponding plurality of second inductive coils positioned correspondingly.

The method may further include providing the first and second inductive coils within environmentally resistant encapsulation, for example polymer encapsulation which is water-proof.

The method may include, where the inductive coupling forms an air core between the first and second inductive coils, providing the inductive coils with ferrite backing, including positioning the ferrite backings relative to the coils so as to increase inductive efficiency within the inductive coupling by minimizing stray flux and increasing flux density across the air core.

The method may include providing the seat with a metal frame and mounting the first electronics to the metal frame so as to provide a heat sink for the first electronics.

The method may include mounting the second electronics adjacent the second inductive coil, for example so as to be mounted within the second inductive coils, and substantially co-planar therewith.

The method may further include providing a proximity sensor cooperating between the first and second inductive coils so that a coupling proximity of the first and second inductive coils, so as to allow the inductive coupling, is detected by the proximity sensor and wherein the proximity sensor is adapted to communicate a trigger to the first electronics, and communicating the trigger to the first electronics upon attaining the coupling proximity, and wherein the first electronics may be adapted to only energize the first inductive coil upon the communication of the trigger. The proximity sensor may be provided with a first element adjacent the first inductive coil and a second element adjacent the second inductive coil, wherein the first and second elements cooperate to generate the trigger. The first element may be a hall effect sensor and the second element may be a magnet.

The method may include providing at least one main battery assembly with a battery charging and control circuit and monitoring the charging required by the main battery or batteries. The circuit may correspondingly charge each main battery as required upon the inductive coupling, and wherein if the battery charging and control circuit determines no charging of the main battery or batteries is required then a corresponding battery status is communicated to the first electronics and the power transfer via the inductive coupling is terminated by the first electronics. The first electronics may interrogate the second electronics upon the inductive coupling to determine the charging required by each main battery.

The method may include providing the first and second inductive coils with, respectively: a first power transfer coil and a separate first data transfer coil; and, a second power transfer coil and a separate second data transfer coil, where the first and second data transfer coils may be embedded in, respectively, the first and second power transfer coils, and where the first and second inductive coils may each have a ferrite backing and where the first and second data transfer coils may be interleaved with the first and second power transfer coils and the ferrite backings. The first and second data transfer coils may be provided in a non-concentric arrangement with the first and second power transfer coils respectively, and where the first and second data transfer coils may be provided in spaced apart from the first and second power transfer coils respectively, and where the first power transfer coil and the first data transfer coil may be substantially co-planar.

BRIEF DESCRIPTION OF THE DRAWINGS

In the drawings wherein like reference numerals depict corresponding parts in each view:

FIG. 5a is a cross-section laterally through an opposed facing primary and secondary coil pair mounted on a seat back and an apparel respectively, wherein no ferrite backing is provided for the coils.

FIG. 5b is a Cross-section laterally through a ferrite-backed primary and secondary inductive coil pair, wherein the cross-section is oriented and located such as seen in FIG. 8, showing the magnetic flux lines produced by placing a current through the primary coil. and illustrate how the ferrite-backed coil has a much higher coupling efficiency than in FIG. 5a by minimizing flux leakage (magnetic flux lines whose path is outside the useful or intended magnetic circuit), where the magnetic flux generated in the primary coil does not pass through the secondary coil.

FIG. 7a is, in cross-section view through one side of a primary and secondary pair of opposed facing coils mounted, respectively, on a seat back and back portion of a torso-covering piece of apparel.

FIG. 7b is the cross-section of FIG. 7a wherein the primary and secondary coils have ferrite backing rings which are centered on and cover less than the total surface area of the corresponding coils.

FIG. 7c is the cross-section of FIG. 7b wherein the ferrite backing rings have substantially the same area as the corresponding coils.

FIG. 7d is the cross-section of FIG. 7c wherein the ferrite backing ring backing the primary coil is of greater thickness than the ferrite backing ring backing the secondary coil.

FIG. 7e is the cross-section of FIG. 7c where the area of the ferrite backing rings is larger than that of the primary and secondary coils.

FIG. 7f is, in partially cut away cross sectional view, an enlarged portion of FIG. 8 and illustrating the primary and secondary coils embedded within channel shaped ferrite backing rings.

FIG. 7g is the cross-section of FIG. 7e with the windings of the primary and secondary coils displaced radially outwardly to be flush with the outer diameter of the ferrite backing rings.

FIG. 7h is the cross-section of FIG. 7g wherein the ferrite backings are ferrite discs.

FIG. 12a is the section of FIG. 7a.

FIG. 12b is the section of FIG. 7e.

FIG. 12c is the section of FIG. 7c wherein the primary and secondary coils of FIG. 7c are primary and secondary power transfer coils, and wherein a primary and secondary data transfer coils are mounted concentrically within the primary and secondary power transfer coils respectively so as to be co-planar therewith, and wherein the data transfer coils have corresponding ferrite backings.

FIG. 12d is the section of FIG. 7g wherein the primary and secondary coils of FIG. 7g are primary and secondary power transfer coils and wherein primary and secondary data transfer coils are mounted concentrically within the primary and secondary power transfer coils respectively and so as to overlap the inner diameter of the ferrite backing rings.

FIG. 12e is the section of FIG. 12d with the radial positions of the primary and secondary power transfer coils and the primary and secondary data transfer coils reversed so that the data transfer coils are within the outer diameter of the ferrite backing rings and the power transfer coils are concentrically interior the data transfer coils and co-planar therewith.

FIG. 12f is the section of FIG. 7e with separate primary and secondary data transfer coils embedded centrally within the primary and secondary power transfer coils.

FIG. 12g is the section of FIG. 12b wherein separate primary and secondary data transfer coils are interleaved respectively between the primary and secondary power transfer coils and the corresponding ferrite backing rings.

DETAILED DESCRIPTION OF EMBODIMENTS OF THE INVENTION

Figure 1:
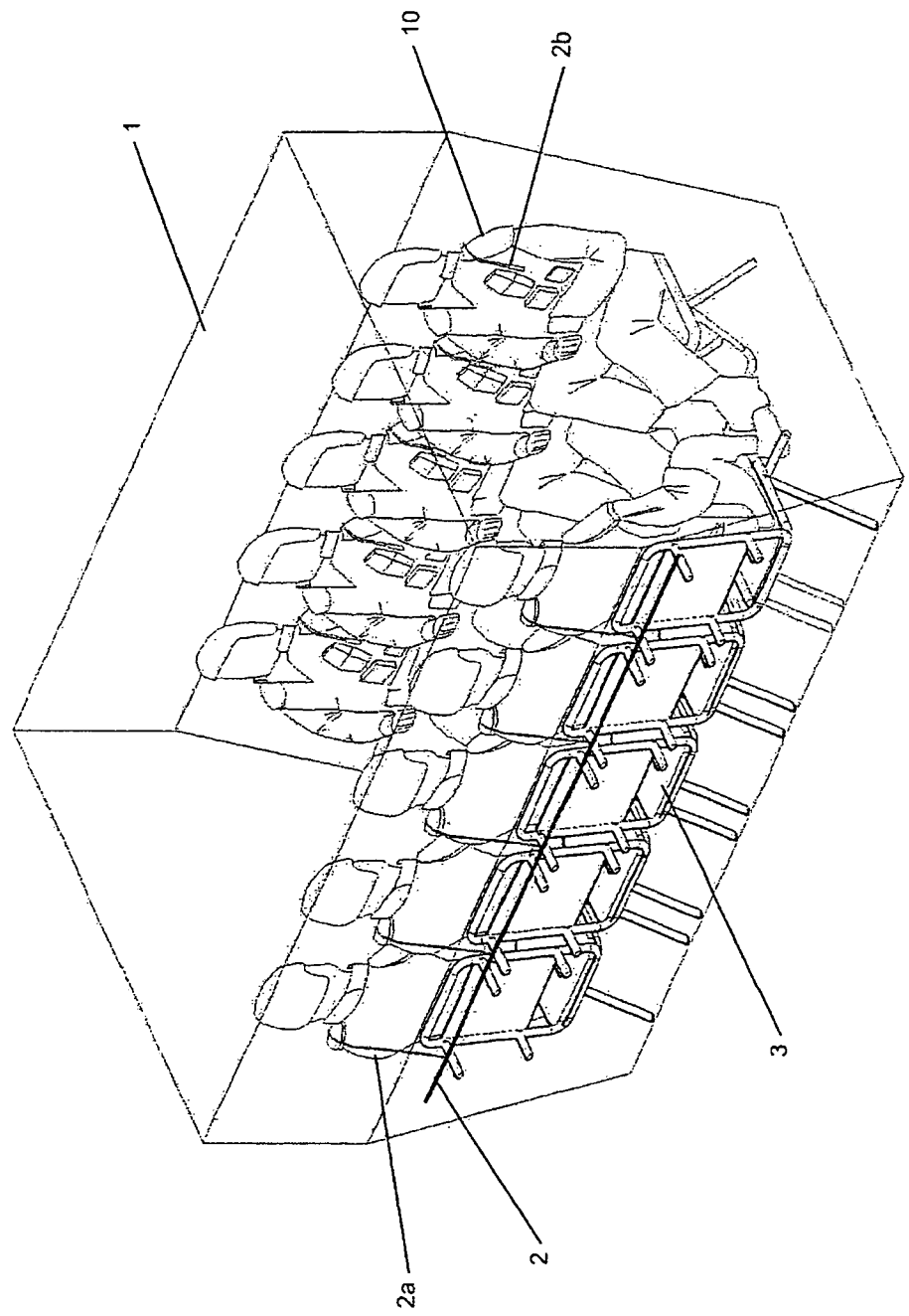
FIG. 1 illustrates conventional very close proximity troop seating within an armoured vehicle, and also illustrates the use of conventional umbilical's for power and data connection where the umbilical's pass over the soldier's shoulders from the main vehicle power and data bus.
Figure 2:
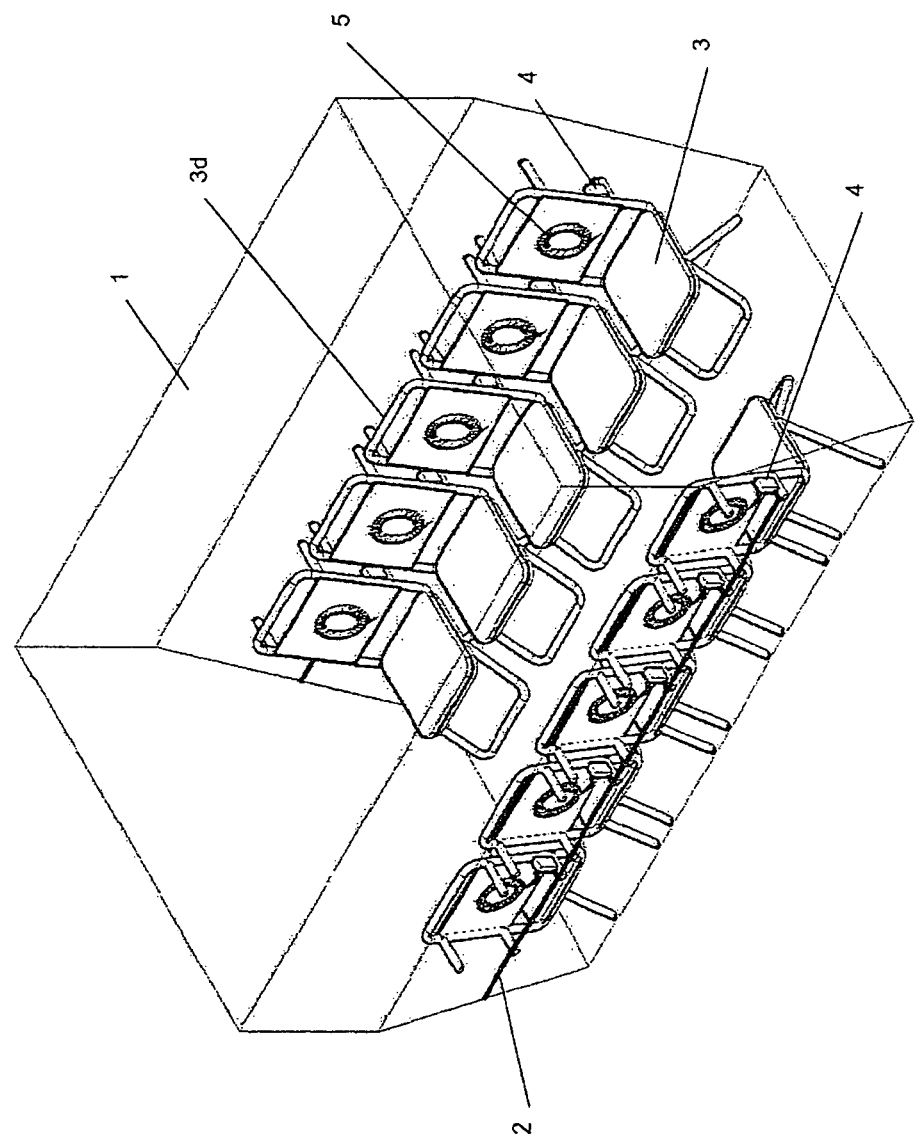
FIG. 2 illustration the conventional troop seating configuration of FIG. 1 wherein the seat backs each have integrated primary inductive charging and inductive data transfer components.

In the prior art, a military vehicle such as discussed above, or an aircraft, or a vessel, or many other forms of vehicles, collectively referred to herein as vehicles, have a hull, wall or body 1 having a direct current (DC) or other power source 2 built therein for providing power and/or data via a cable or umbilical 2a from the power source 2 to a power and/or data cable 2b passing around, over or otherwise too the soldier 10 or other occupant, to an electrical connector on for example the occupants vest or other attire. In what follows although the present invention is described in the detailed example of a solider being transported in a military vehicle, it is to be understood that the present invention is not so limited and may be employed in many other applications, for example, where civilian vehicle occupants are being transported, or where civilians or soldiers are merely waiting, for example seated in a staging area awaiting transport.

Most soldier modernisation system use central rechargeable batteries as the main power source of their electronic equipment suite. A unique opportunity to recharge the battery presents itself when the soldier is being transported by a vehicle such as LAV, HMMV, or any other military vehicle that provides both seats for occupants and a power source for charging. To eliminate the need for connectors that have a high rate of failure, inductively coupled power and data can be transferred from the seat 3 to the soldier. The moment the soldier is sensed to be sitting in the seat, a primary charging inductive coil or coils 5 in the vehicles seat, for example in the seat back 3a, generate a magnetic flux and inductively connect to a secondary inductive coil or coils 6 located on the soldier. Once an inductive connection is made between the primary and secondary coils, the rechargeable central power source starts to receive power. At the same time an inductive communications link may be established between the soldier and the seat providing the soldier with inter and intra vehicle communications capability.

The present invention provides battery charging power and data communications to the soldier through an inductive wireless connection in the vehicle seating. Each seat within the vehicle may be fitted with inductive charging and communications capability, however, the preferred military embodiment is to have such installations in the troop seats. Each of the troop seats may be identically fitted so that the same capability is provided regardless of which seat a soldier would sit in. An optional sensor 9 senses the moment the soldier is sitting in the seat. Primary charging inductive coil or coils 5 in the vehicles seat 3 then are triggered, for example by a proximity sensor trigger 12 (a magnet in the case of a hall effect sensor) to generate a magnetic flux and inductively connect to a secondary inductive coil or coils 6 located on the soldier. Once an inductive connection is made between the primary and secondary coils, the rechargeable central or main power source such as main battery 14 would start to receive power, for example by the operation of central battery charging sub-circuit 15. At the same time an inductive communications link may be established between the soldier and the seat providing the soldier with inter and intra vehicle communications capability. The power that may be provided through seat inductive charging would be determined by the capacity of the batteries carried by the soldier, with no reasonable upper limit on the capacity to be charged. Communications with vehicle crew would be immediate.

Troop seating which is provided within vehicles, aircraft and marine transport is of many varieties, but for the most part in vehicles and aircraft is an energy or shock absorbing seat to protect troops from either improved explosive device (IED) blast acceleration, or, in the case of aircraft, protection from hard or crash landings. The seats may face any direction and be attached to bulkheads, sidewalls or may be frame mounted. Most troop seats are fabricated with a simple tubular frame fitted with a fabric sling seat and back or may be upholstered seats with foam cushioning and even bolsters. Restraint systems such as lap belts or four point harnesses are usually incorporated into the seat design to keep the soldier secure if a rapid acceleration is too occur. Regardless of the seat design, soft or hard materials used, or construction methodology, most if not all seating may be fitted with an inductive charging and data communication system according to the present invention.

To accommodate the different height of torso on a soldier where the secondary inductive circuit may be located, (that is, the taller the torso, the potentially higher the location of the secondary inductive circuit) a height adjustment capability may be incorporated for the primary circuit in the seat back. Such a primary circuit may for example slide up and down within a flexible or semi-rigid (e.g. fabric or plastic) channel 3b and be secured in place at the desired height with a fastening device such as webbing 3c with hook-and-loop fasteners.

The inductive seat charging system according to the present invention may be designed into new seats or be retrofitted onto existing vehicle seating. Where the seat back 3a is a fabric sling back, the fabric back may simply be removed and replaced with a fabric back incorporating the primary inductive coil 5 and proximity sensors 9. On foam upholstered seats a new seat cover may be provided that incorporates the primary coil or alternately an elasticized sleeve seat cover containing a primary power and data coil assembly may be slid over the seat back. Other ways of attaching the primary coil to the seat may be designed to provide this same functionality as described.

In one embodiment, the primary coil assembly 5 is placed on the back side of the front seat cover, and the primary coil drive electronics 4, may be located at a remote location (for example approximately 15 cm-1 m) from the primary coil assembly with connecting cable 8 there-between. The coil assembly 5 may be thin, i.e. <5 mm. The bulk of the drive circuit 4 would give coil assembly 5 a profile that is not conducive to being located inside a seat cover. Consequently, until such time as the drive circuit 4 may be sufficiently miniaturized, it may but be mounted on the seat frame 3d. The primary coil winding 33 may be of different geometries, but typically it will be planar, with the option of a ferrite backing and shielding.

The primary inductive driver circuit 4 may be configured to accommodate most types of input power including both AC and DC power inputs. Typical military aircraft and vehicle power input requirements are presently 28 VDC, whereas many commercial vehicles are presently 12 VDC. Interface may also be required to a CANBUS system or Common Modular Power System (CMPS) smart vehicle system for easy configuration and diagnostic capability.

Next generation commercial and military vehicles may employ higher voltage energy storage plants such as Lithium-Ion Batteries or Super Capacitors. These energy storage plants will typically operate at around 300 VDC to optimize hybrid motor operation. The ability to provide significant amounts of power at higher voltage power may dictate new inputs for power conversion systems.

Figure 3A:
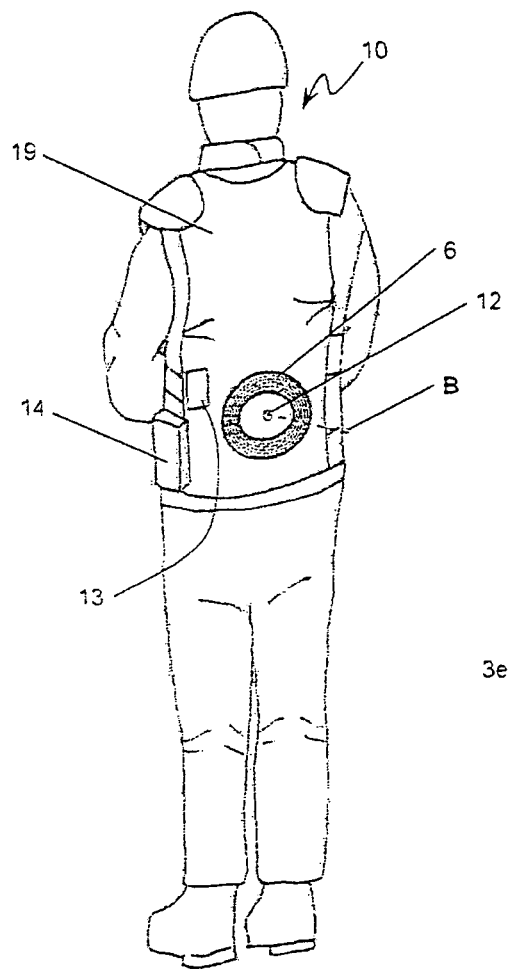
FIG. 3a illustrates a standing soldier wearing torso-covering apparel having a secondary inductive power and data receiving coil, a charging circuit and a central or main battery integrated into a load carriage vest or tactical ballistic vest.
Figure 3B:
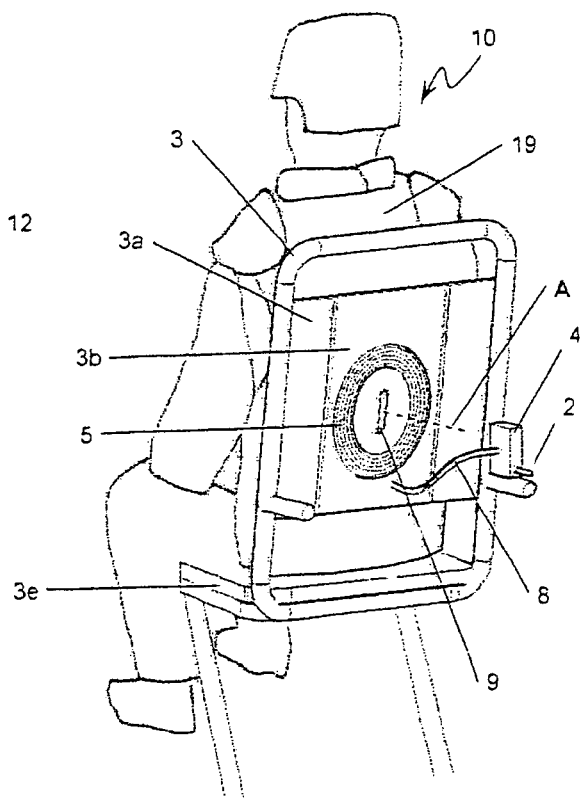
FIG. 3b illustrates a soldier wearing the same inductive vest as seen in FIG. 3a, sitting in a vehicle seat of FIG. 2 so as to receive wireless power and data from the seat via the primary power and data inductive system incorporated into the seat back.
Figure 4:
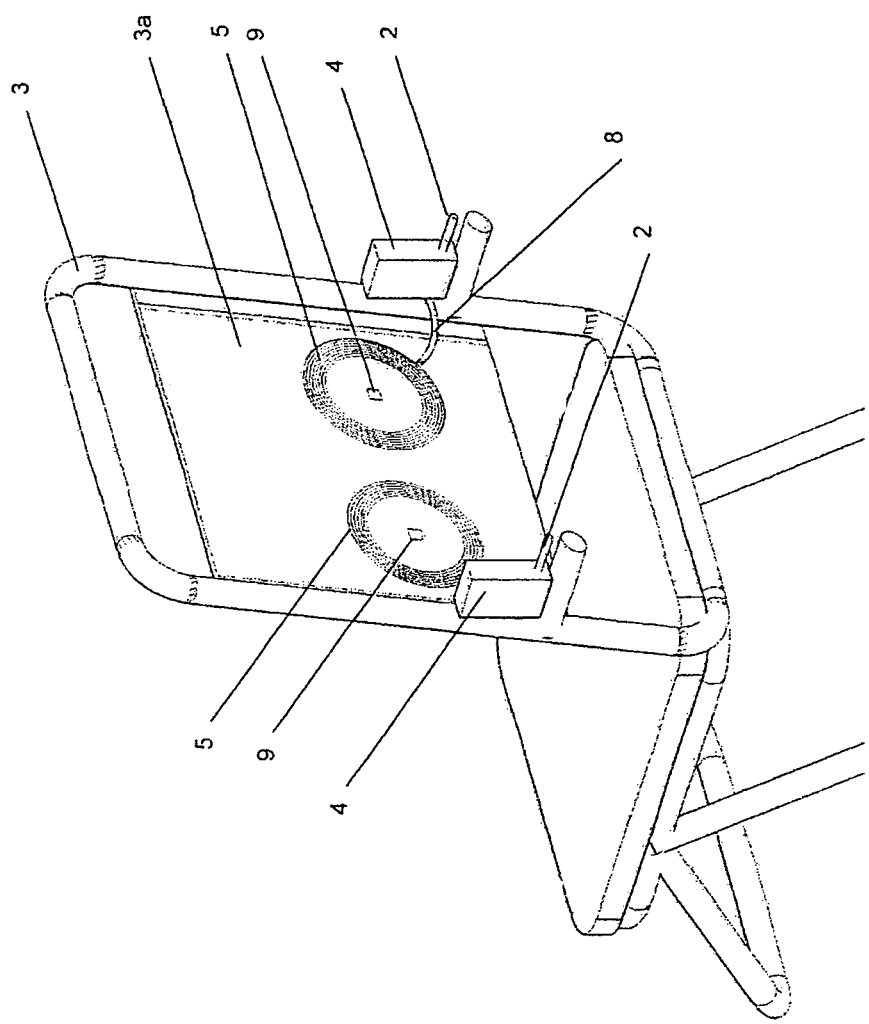
FIG. 4 is an alternative embodiment of the seat of FIG. 3b a wherein the seat back has two primary inductive drive circuits powering two independent primary coils, each having proximity sensors.
Figure 6:
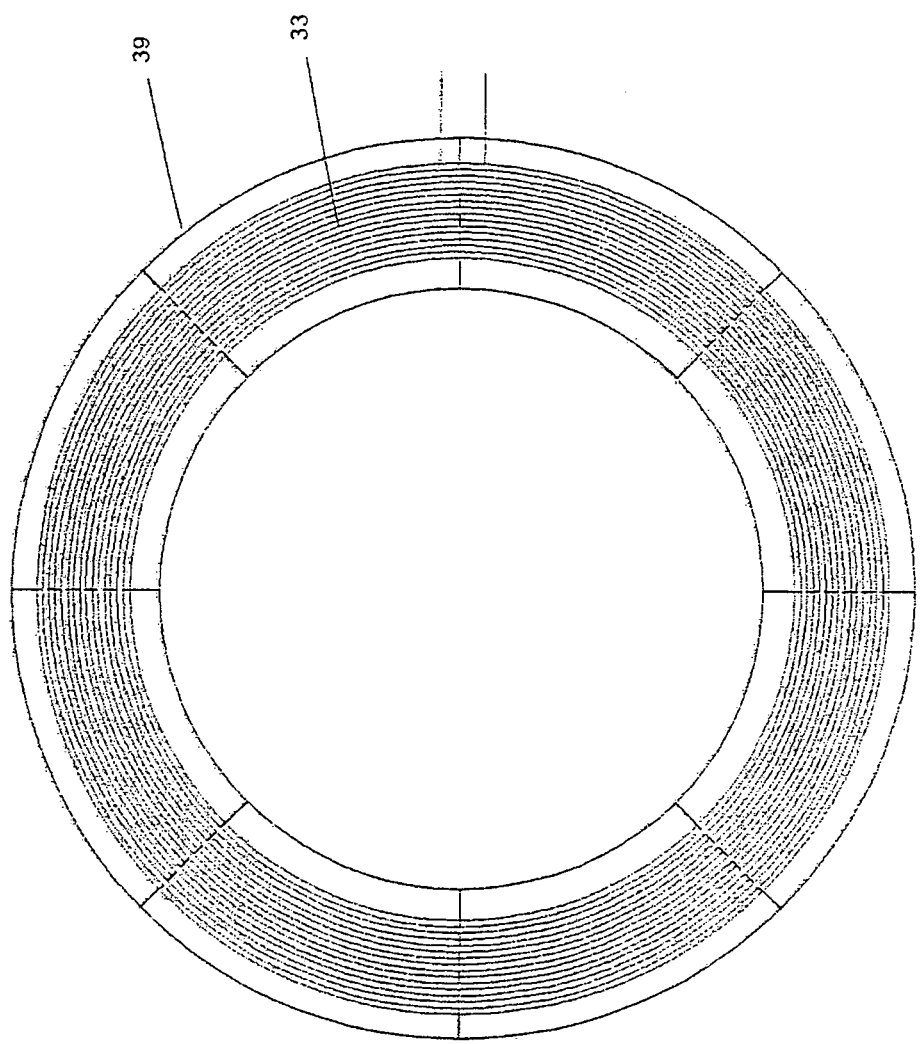
FIG. 6 is a plan view of segmented ferrite for either the primary or secondary coil so as to provide movement and flexibility for the coils wherein the segments may be backed with Mu metal or flexible shielding and are encapsulated in a flexible polymer.

At the present time it is expected that initial power output to the battery charging circuit 15 will be approximately 100 W which would allow the charging of two 100 W batteries at a 0.5 C charge rate. However in the foreseeable future, the charge rate capacity of soldier system main power batteries 14 may increase to as much as 2 C or greater. As it will be very desirable to charge the main batteries as fully and quickly as possible to obtain as much power in what maybe very short time periods, the output of the primary circuit 4 and the secondary circuit 13 will need to be increased to stay in line with battery charging technology advancements. The secondary coils 6 for power and data along with associated rectification subcircuit 16 and power and data conditioning electronics, power management sub-system 17, may be placed in and around the back of the soldier's apparel 19 such that the secondary coil 6 would be located as close to the seat back 3a as possible and on the same axis A as the primary coil 5, that is, so that axis B of coil 6 is substantially co-axial with axis A of coil 5, to provide the highest inductive coupling efficiency as seen in FIG. 3b for example. As used herein the term apparel is intended to include webbing, vests, body armor, backpacks, harnesses, coats, shorts, belts, pants, shorts, gloves, goggles, glasses, hats, helmets.

The secondary circuit of the inductive power transfer system, the AC rectification and voltage regulation circuit may be configured to provide a specific DC voltage to the battery charging circuit, with the voltage range typically in the range of 15-24 volts DC. The battery charging circuit may be designed to accommodate SMBus smart battery data protocols.

An inductive charging vehicle seat eliminates the need for switched power umbilical cables that provide electrical power and communications data to a mating connector on the soldier's clothing or equipment for the purpose of charging discrete pieces of equipment batteries or central batteries. The interior of military vehicles such as seen in FIG. 1 is very confined and busy with existing equipment, therefore the elimination of up to eight pendant cables would be of considerable benefit. In addition the cables must be switched so that unprotected live cables cannot short if they come into contact with stray conductive objects. Inductive connectors according to the present invention would automatically switch and cannot be shorted by metallic objects. A very particular nuisance for existing connector technologies is the low survival rate of the connector during multiple rough connect and disconnect cycles associated with the often harsh military vehicle environment.

Cleanliness of the connector socket that may be located outside of a soldier's sight line, is difficult to inspect prior to connection. Sockets are frequently rendered inoperable due to environmental (i.e. mud, sand, dust etc) contamination. The load carriage vest of a soldier protrudes as much as 6 inches away from the lower part of his torso. Due to the roughness of the ride within a military vehicle, there may be considerable difficulty for troops to be able to locate the system charging socket under all their vest equipment and establish a power connection. Any connections that must be made underneath the overhang of the vest must be made by feel alone. If the connector pins are damaged, obstructed or sufficiently dirty to not make contact when connected to the vehicle, it may be impossible for the soldier to clean or otherwise repair the connector until the soldier takes the load carriage off. Not only is this nearly physically impossible within the confines of the vehicle, but also not advisable if a rapid dis-embarkment were to take place.

If a soldier has to rapidly disembark, the soldier may disconnect early, removing the opportunity for further charging and continued communication with the vehicle operators. They may also disembark hurriedly without disconnection and damage either the connector or cable on the vehicle or their own equipment.

A soldier may be in the vehicle for a sufficiently short time that they do not bother to plug into the umbilical and therefore lose recharge time that would otherwise have been obtained as soon as they sat in an inductive charging capable seat. These issues are mostly if not entirely eliminated by the contactless power and data transfer afforded by inductive power and data coupling according to the present invention. Any occupant of the seat would instantly and automatically start to receive charge even for very short periods of time in situations where the occupant would otherwise probably not bother to use a manual connection.

The connection between the central battery or batteries of the soldier is unaffected by the introduction of inductive charging to the soldier system and the central battery may still be swapped out for a fully recharged one as would have been previously done.

Additional benefits may include one or more of the following:

The system is environmental proof in that both the primary and secondary coils and associated circuits are completely sealed, as no physical system connection by the soldier is required. Therefore the inductive power and data transmission system, in that it is completely sealed from the environment, may be fully submersed and remain unaffected by sand, dirt, snow and POL's (petroleum's, oils and lubricants).

If a soldier is injured the soldier may not be able to connect the in-vehicle power and data connector. With the inductive coupler the soldier only needs to be able to sit in the seat to receive power and be able to communicate. If the seat is of a design which allows the seat to be reclined, the solider may in effect lay down, and still be both re-charging and communicating.

As the power and data transmission use magnetic resonance (inductive coupling) to connect, they are unaffected by radio jamming technologies used to defend against radio frequency (RF) initiated IED's.

When a soldier dons a nuclear/biological/chemical (NBC) mask, it is often extremely difficult for the solider to look down or around, especially within the confines of a vehicle. A considerable issue is the fogging up of the eye lenses which makes the simple task of making connections within a vehicle very challenging. All other equipment must remain functional, including charging of all electronics. The more encumbered and stressed the soldier becomes, the less likely the soldier is too perform routine procedures such as plugging in power cables. The necessity to remember to plug in is removed from the soldier with inductive charging.

In addition to armoured vehicle use, the same soldiers that would use inductive charging in a vehicle could just as easily be transported in an airplane, helicopter, hybrid aircraft such as the V-22 Osprey; fast transport vessels such as hovercraft or AAAV (Advanced Amphibious Assault Vehicle) or ATV's and any type of marine vessel etc. All the attributes and benefits of using inductive charging, data and communications applies to the use of the inductive charging seats according to the present invention in these modes of transport as it does ground vehicles.

The inductive system may for example be fitted in extremely wet environments such as fast river boats where conditions almost approach submersion or when operating in freezing conditions where conventional connector operation would be extremely difficult. Due to the fact that inductive charging can operate while submersed or even when coated in ice, these type of operating conditions do not present insurmountable obstacles to charging of central batteries worn by the soldier.

As stated above, although a preferred embodiment is primarily intended for military applications, the present invention is not limited to military as it could also be used by first responders such as police and fire or civilians in commercial or private applications. With the proliferation of inductively charged systems for personal electronics, civilian garments may be designed with central charging systems. The electronic devices carried within these garments may then be charged when the occupants are seated in a vehicle such as a car or truck equipped with an inductive charging seat.

The primary drive circuit device uses an LC resonant tank circuit that is inductively coupled to a secondary coil and associated circuits, and forms an air core transformer. The primary circuit electronics may be comprised of both control and inductive resonant circuits. The primary side may typically include, but not be limited too, a frequency generating or oscillator circuit and a power switching driver(s) such as a MOSFET full or half bridge driver that in turn powers the LC resonant tank circuit placing a current through the coil. An optional feedback loop may maintain optimal resonant frequencies. Base power for the primary circuit is provided from the main power DC power bus of the vehicle. If required there may be two or more independent primary circuits each leading to their own corresponding primary coils located in different places on the seat. Each primary coil in turn inductively connects to a corresponding secondary coil and charging circuit that are each placed in different areas of the soldiers apparel, for example spaced apart on the torso.

The primary charging power circuit may be tuned to a single frequency, for example, 200 kHz or be an auto tune circuit that maintains resonance over a small range of frequencies as external factors dictate as would be known to one skilled in the art. Many topologies or architectures for this circuit may be constructed depending on the needs identified or specific design requirements that accommodate different frequencies, impedance, inductance and capacitance of the major components, again as would be known to one skilled in the art. The resonant frequency of the charging tank circuit would typically be selected within the range of 100-500 kHz, but certain applications may require operation into the 10's of MHz. The resonant characteristics of the tank circuit will change as the distance between the primary and secondary coil distance changes, due to the mutual inductance of the primary and secondary coils changing, which in turn changes the apparent inductance of the primary coil and so changes the resonant frequency of the tank circuit. The primary inductive resonant circuit may therefore be auto-tuned to work over a pre-determined range of operating distance, that is, the distance between coils 5 and 6 when the solider 10 is properly seated in seat 3 against seat back 3a, so as to obtain optimal performance. This operating distance in turn is determined by the sensitivity of the optional proximity sensor 9 and the distance over which it will turn the primary circuit on and off. Depending on how much soldier 10 moves around in the seat, that is the magnitude and frequency of soldier 10 shifting away from or out of alignment with a seat back 3a, the primary circuit may turn on and off many times a minute or only once in several minutes. The tuning optimisation of the primary power resonant frequency, is preferably performed by a tank circuit auto-tune sub-circuit integral to the primary coil drive. There are several ways that this could be performed as would be known to one skilled in the art.

In many inductive power charging applications the primary circuit is co-located with the primary drive coil. However in this application the primary circuit may be located at a short distance (e.g. 10-50 cm) away, mounted on the seat frame. A shielded cable 8 may be used to connect the primary coil 5 to the primary drive circuit 4. It may be advantageous to mount the primary circuit on seat frame 3d because the frame provides a heat sink, allowing for high power output circuit designs.

Shielding and appropriate circuit design is described as the primary circuit must not cause disruptive EMI or be susceptible to EMI.

The secondary charging and controller circuit 14 may be co-located with the secondary charging coil 6 on the torso of the soldier's, apparel. For example it may be integrated into the load carriage or tactical vest 19. The secondary circuit 13 provides rectification of the received inductive AC power signal. It also regulates the voltage as required, and passes power to the battery charging and control circuit 15. The battery charging circuit 15 monitors the charge required by the central battery 14 and charges it accordingly when power is available from the primary coil 5 via the secondary coil 6. The primary circuit 4, via coils 5 and 6, may inductively interrogate the secondary circuit 13 to, firstly, determine if the secondary circuit 13 is present, and secondly, determine if charging of central battery 14 is required, as reported by the secondary circuit 13. If battery 14 does not need charging, then the primary circuit 4 removes charging power and falls back into and interrogate-only mode.

The central battery 14 (or batteries 14) of the solider system may be of any type of rechargeable battery, although a high capacity Li-Ion battery or similar is preferred due to its high energy density. The battery 14 may be of conventional box shape configuration, a flexible or conformal battery, or be a battery that is a part of a hard armour ballistic plate. The battery may be a stand alone battery that powers the various electronic devices 18 on the soldier 10 or be configured to be managed by a power management system 64 as a part of the soldier system. The central battery 14 (or batteries 14) may power inductively charged modular pockets carried on the soldier's apparel including vest 19, etcetera . . . .

The primary drive circuit may, as mentioned above, include a low power proximity sensing circuit. This circuit, in conjunction with for example a hall effect detector 9 located within the primary coil 5 and a magnetic trigger 12 within the secondary coil 6, would allow for more energy efficient operation, as the primary circuit 4 would not have to constantly poll for the presence of secondary circuit 13.

Instead of a hardware device being used as the secondary circuit proximity detector 9, the primary circuit 4 may be used to "ping" or poll for the secondary circuit 13. Again, many options are available. One such option is that the auto tune circuit looks for a change in the inductance of primary coil 5. As the secondary coil 6 is brought into proximity, the mutual inductance of coil 6 as it couples with the primary coil 5 changes the inductance of primary coil 5. This can be detected by the auto-tune circuit of the primary coil. A second example is that the primary coil data circuit 4 would poll on a regular basis and wait for a data response back from the secondary circuit 13. These examples are intended to be illustrative and not to be limiting.

The primary coil 5 is, as mentioned above, in one embodiment a low profile design (i.e. <5 mm) to allow it to be easily fitted into or onto almost any seat designs. Coil windings 33 and 34 of the primary and secondary coils respectively may for example be wire wound using conventional enamelled copper magnet wire, multi-filament Litz wire, coil designs etched into single, double sided or multi-layer printed circuit boards, single, double sided or multi-layer flexible substrates such as Mylar™ or Kapton™ etc, and be of substantially any geometric shape, all of which as would be known to one skilled in the art. The primary coil may be larger than the secondary coil, or the secondary coil may be larger than the primary coil and each may be of a different shape. For example the primary coil may be elliptical in shape and the secondary coil circular or an ellipse rotated 90 degrees to the elliptical coil in the seat. Coils with a Q-factor from very low to greater than 100 may be used as the coil orientation is primarily fixed and therefore can accommodate a variety of coil designs and 'Q'. The higher the Q however, the better coupled the coils and overall system efficiency will be higher or better optimised.

The primary and secondary coils may be air backed or, to aid in optimising the efficiency of the inductive wireless power transfer between the primary and secondary coils, different shapes and thickness of ferrite backing may be employed to manipulate the shape of the coils magnet flux, such as flux 37. For example, the ferrite may be of a simple round planar design or utilise more complex geometries (ovals, hexagon etc) to accommodate location within the seat or the torso of the soldier's apparel for the primary and secondary coils respectively. The ferrite may be of conventional rigid ceramic or a flexible polymer based ferrite. If a rigid ferrite is used to back the coil, the planar ferrite may be one of many profiles such as a bar, channel or angle and may either be curved so as to be form fitting to the curvature of the seat back or may be divided into segments. Segmenting the ferrite allows a modest amount of flex, that is, an encapsulated coil assembly may flex so that it may conform to the shape of the seat back as the seat back deforms when it is occupied. A laminated or woven high permeability material may be used behind the coils for mechanical structure and shielding.

As seen in the illustrated examples of FIGS. 7a-7h, the ferrite backing 35 and coil assembly may be encapsulated in either a rigid or flexible protective polymer that would not only provide it with the environmental protection required but also provide it with the mechanical support and attachment points required for some of the embodiments identified above.

The secondary coil 6 may also have a ferrite backing 36 and may also be encased in an environmentally resistant casing such as of plastic or other polymer encapsulation 31. The secondary coil and device would also be ruggedized and environmental proof, for example at least water-proof.

In some circumstances the use of primary and secondary co-axial coils with a cylindrical design maybe advantageous.

As mentioned earlier the primary and secondary circuits may employ a device or proximity detection circuit. Proximity sensing could be performed in many ways including inductive, capacitive, hall effect, so that the primary drive circuit is not activated when turned on at the main power switch unless a secondary coil has triggered the proximity sensor is present. One example of a proximity sensing device example would be that a magnet of suitable strength is placed within the secondary coil so that a hall effect sensor within the primary coil is activated when the secondary coil is placed in a position allowing it to inductively couple with the primary coil. When the hall effect sensor within the primary coil assembly is activated by the presence of the magnet in the secondary coil the main drive circuit is allowed to be switched on.

The secondary coil would preferably be located on the lower back of the soldier's apparel so that it would align with the primary coils placed into the seat back. The secondary coil would also be constructed to be as thin as possible using, for example, the same construction methods identified for the primary coil. The secondary coil may be placed into a sleeve on either the outer load carriage vest or ballistic protection vest. The secondary regulation and charging and controller circuit cooperating with the secondary coil may be located to the side of the secondary coil so as to minimize bulk in the small of the back that would cause discomfort to the solider.

To reduce electromagnetic interference that may be caused by the inductive charging system it may be necessary to place a shield around the coils and ferrites using thin lightweight shielding materials such as Mu metal or other high permeability materials.

Although in a preferred embodiment the primary coil is held securely within or on the seat back, it is advantageous if the position of the primary coil accommodate different sized torsos, as all soldiers are not the same size, and in particular may have different back heights. One way to selectively position the primary coil is too provide the primary coil encapsulation with a vertical height adjustment. The primary coil assembly 5 may be fitted with a fabric strap or webbing 3c secured with a hook and loop fastener that would allow the coil height to be adjusted within a channel 3b on the seat back 3a and then be secured in place. Other elevation means may also be employed to selectively elevate the primary coil assembly.

For seats that need only temporary inductive power and data connectivity a fabric seat cover for example formed as a fabric sleeve, and holding the primary coil assembly. may be slipped over the seat back of a seat and secured in place with straps or elastic not shown.

Other locations that could be used for mounting a primary coil on a troop seat include the seat bottom 3e and bolsters on both the seat bottom and back. A headrest with integrated inductive primary charging and data coils could be used to charge a central battery located on a helmet and communicate data to devices on the helmet In parallel with the provision of power, existing troop umbilical cables also provide communications and data to the soldier. Communications may be to the vehicle crew or in some instances to a battlefield command relayed through the vehicles radio network. Data can include up and downloads for C4I, GPS position data or simply external video feed from the vehicle so that troops know what to expect when they disembark. To be truly wireless, the data must also be provided wirelessly to the soldier. Therefore data transmission includes the ability to transmit and receive, voice or audio, text, still images and streaming video. One way this can be done, without using radio frequency transmissions, is to also use inductive data transmission from the seat to the soldier. The data received by the secondary data coil and decoding circuits located on the soldier would be sent from the decoding processor circuit either directly to the soldiers data receiving devices or via the central distribution hub or computing component.

The primary data and secondary inductive coils may be placed as separate entities or coil assemblies from the inductive charging coils, the data coil assemblies having a distinctly separate central axis that provides optimal inductive data coupling than the axis used by the inductive power coils. The primary and secondary data coils may also be integrated into the power coil assemblies so that only one combined encapsulated coil assembly needs to be located on the seat back or on the back of the soldier.

For example, inductive data may be transmitted by an inductive coil and driver circuit when a microprocessor within the drive circuit sends data encoded for serial transmission to a data driver transistor that turns on and off very rapidly and by so doing modulates the coil voltage across a tuned LC circuit. The modulated signal is transmitted by the primary side coil across the inductively coupled link to the secondary coil which generates an encoded AC signal that is then decoded back to serial data. Simplified block schematics are provided in FIGS. 10 and 11.

A single primary coil used for power transfer may also be modulated to provide data transfer to a single secondary coil which would also demodulate the data when it is not in power receiving mode.

Two coils on each of the primary and secondary side of the inductively coupled circuit may be employed for both power and data transmission. On each side of the inductive circuit one coil would provide power transmission and the other data transmission to their inductively mating coils on the secondary side. The separate coils may be used for power transfer at a first frequency 'A' while the second coil operating at a second frequency 'B' may be used for data transfer. By using appropriate filtering neither of the frequencies would interfere with the other. This allows each of the power and data circuits to be optimised electrically for each function.

The data receiver coils may utilise a three-dimensional ("3D") coil so that conditions are optimised for it to receive a signal via the magnetic flux when not aligned parallel to the primary coil. For communication through a seat back a 3D coil assembly may not be necessary as the send and receive coils will be both substantially accurately aligned and predictably aligned, suiting the use of a simpler two-dimensional coil architecture such as that used for the inductive power transmission coil. FIG. 12 shows example configurations of the coil or antenna for the transfer of both inductive power and data.

Other options may include providing power at a lower resonant frequency and then transmitting the data frequency at a higher frequency. For example the power frequency may be 125 khz and data may be sent at 135, 200 kHz or higher. Typically data is transmitted using the high frequency band of 13.56 Mhz to allow high data rate throughputs. In the US Army WPAN description data rates of between 9.6 Kbps for physiological status monitors to 256 Kbps for weapon ballistics computation were identified as required data rates. Baud rates of greater than 80 Kbps second are required if low resolution streaming video is to be supported.

Figure 10:
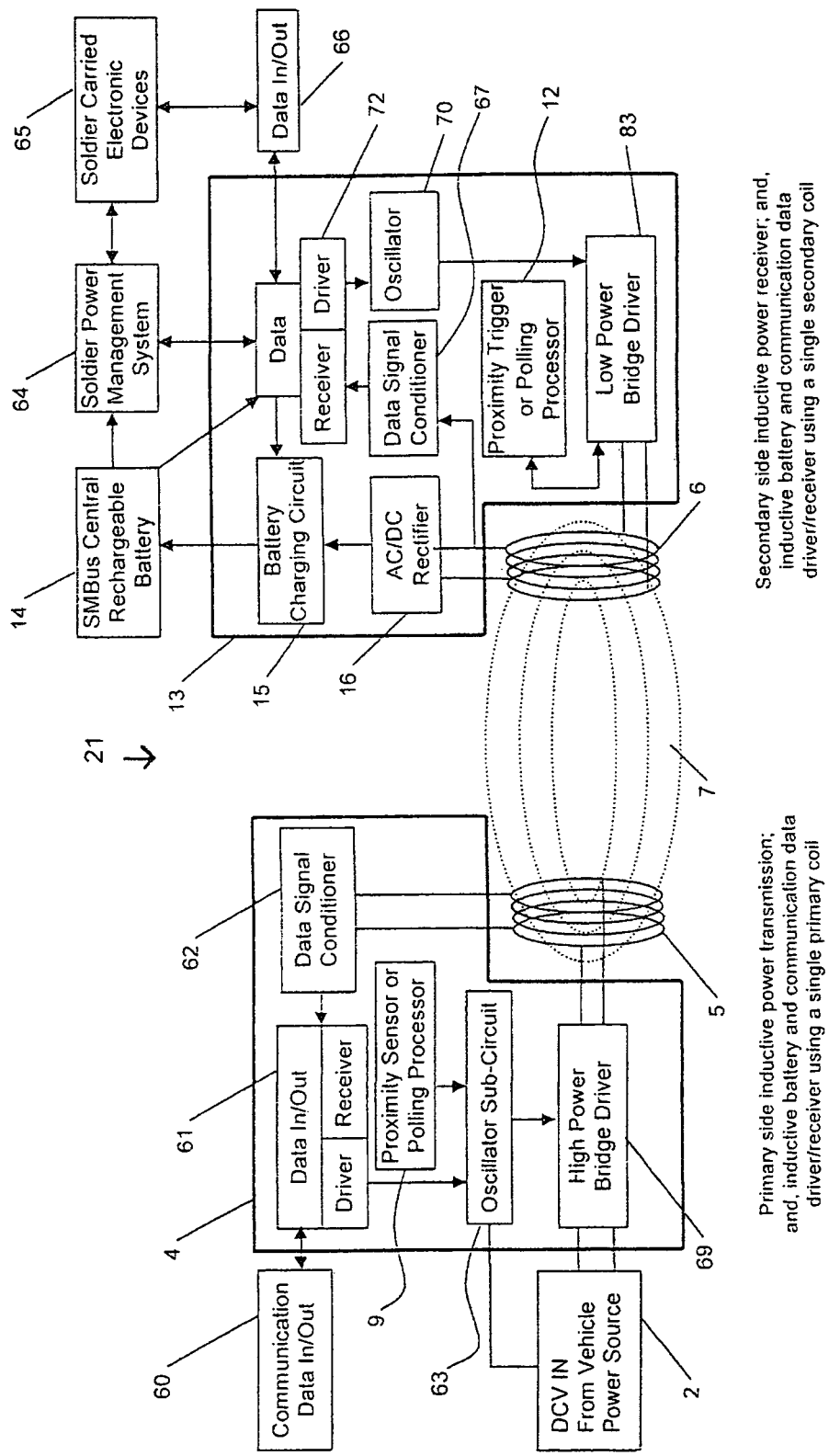
FIG. 10 is a simplified schematic block diagram showing inductive power and data transfer using a single coil on each of the primary and secondary sides.

FIG. 10 illustrates a schematic block diagram where power and data is transferred inductively using only a single primary coil and corresponding single secondary coil, 5 and 6 respectively. In FIG. 10, the primary side is to the left of the magnetic flux lines 7 and the secondary side is to the right of the magnetic flux lines 7. Magnetic flux lines 7 illustrate the inductive coupling across the air gap 21 between primary coil 5 and secondary coil 6. On the primary side, a DC power source 2 from the vehicle provides power to both high bridge driver 69 and tank circuit oscillator sub-circuit 63. Proximity sensor 9 or a polling processor cooperates with oscillator sub-circuit 63 so that oscillator sub-circuit 63 is only enabled when the secondary side is in proximity, whether detected by a sensor 9 or by polling intermittently via oscillator sub-circuit 63. With oscillator sub-circuit 63 enabled, high power bridge driver 69 drives coil 5 so as to inductively couple with the secondary coil 6 across magnetic flux 7. When it is desired to transmit data, the transfer of power is discontinued or disabled and the communication data in/out port 60 provides data in and out of primary data processor driver/receiver 61. The data driver cooperates with oscillator sub-circuit 63 to thereby modulate primary coil 5 for the sending of data to the secondary side. A primary side data signal conditioner 62 cooperates between primary coil 5 and primary data processor driver/receiver 61.

On the secondary side, the AC signal received by secondary coil 6 via magnetic flux 7, is rectified within AC/DC rectification sub-circuit 16. Rectification circuit 16 cooperates with central battery charging sub-circuit 15 which in turn provides charging to central rechargeable battery 14. Battery 14 provides power to soldier power management system 64 which in turn provides power as needed to the soldier carried electronic devices 65, alternatively referred to above as electronic devices 18. Electronic devices 65, 18, power management system 64, and battery 14, provide data to secondary side data processor driver/receiver 72. Secondary side data processor driver/receiver 72 cooperates with battery charging circuit 15, the receiver side of driver/receiver 72 cooperating with secondary side data signal conditioner 67 and the driver side cooperating with data signal conditioning circuit/oscillator 70. Data signal conditioner 67 cooperates with secondary coil 6. Oscillator 70 cooperates with low power bridge driver 83. The trigger device 12 for proximity sensor 9, if employed, or for example a polling processor in place of trigger device 12, cooperates with low power bridge driver 83.

Figure 11:
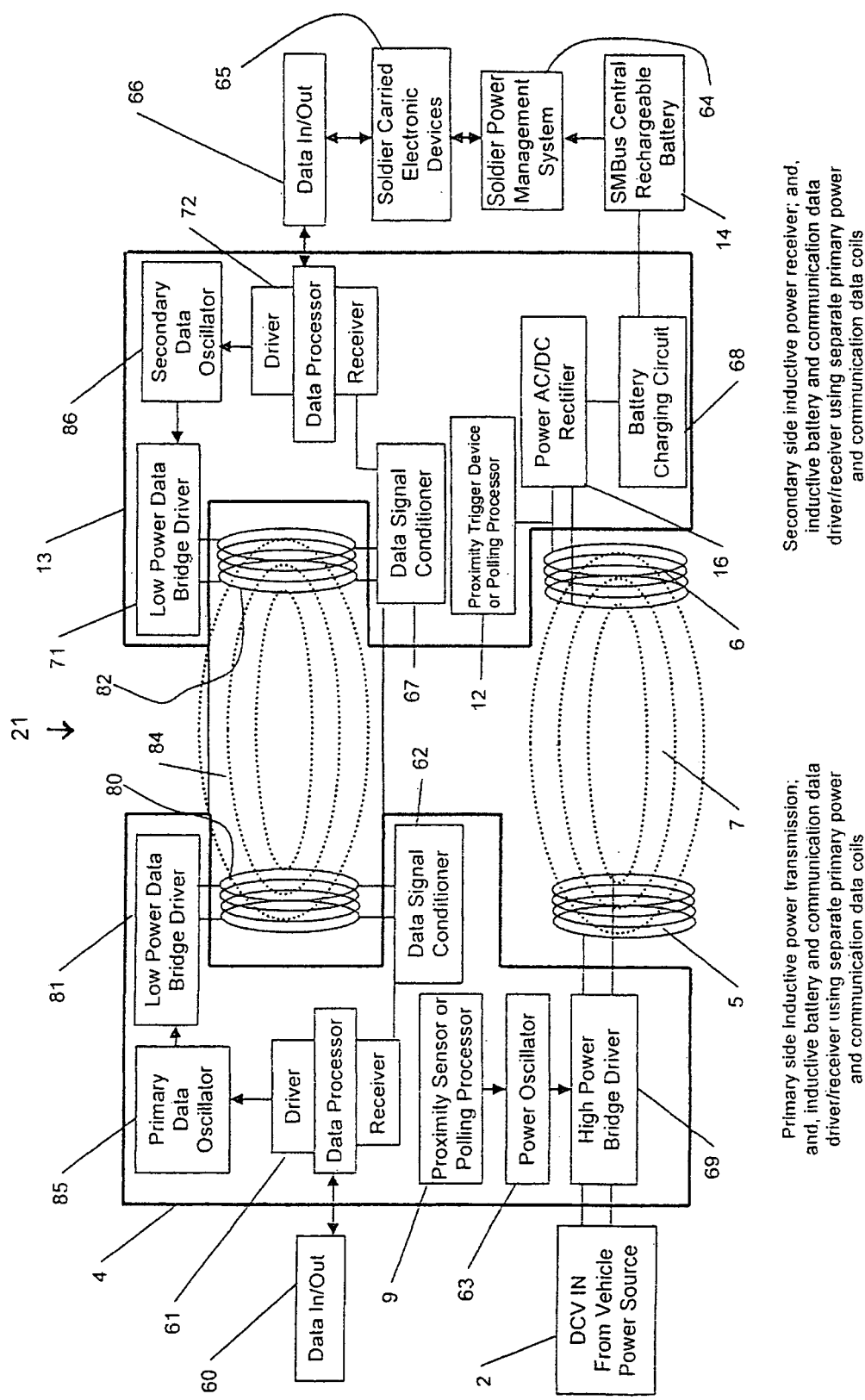
FIG. 11 is a simplified schematic block diagram showing inductive power and data transfer using separate coils on each of the primary and secondary sides.

FIG. 11 illustrates a schematic block diagram wherein the inductive transfer of power and data is accomplished using separate primary and secondary coil pairs. Although the power transfer coils and data transfer coil are illustrated as being physically separate, that is, non-concentric, it is understood that this is not intended to be limiting in that the power transfer coils and data transfer coils may also be concentric and adjacent, concentric and embedded, concentric and layered one behind the other or interleaved and adjacent a ferrite backing to name just a few examples.

Thus as seen in FIG. 11, as already described in respect of FIG. 10, power is transferred from primary coil 5 to secondary coil 6 across magnetic flux 7. A power source 2 from the vehicle provides power for a high power bridge driver 69 which provides power to primary coil 5. In the embodiment employing either proximity sensing or polling to detect the presence of the secondary coil 6, a proximity sensor 9 or polling processor as described above cooperates with a tank circuit oscillator sub-circuit 63 which in turn cooperates with high power bridge driver 69. On the secondary side of the power transfer, AC rectification sub-circuit 16 cooperates with secondary coil 6, and provides a rectified voltage to battery charging circuit 68. Again, as described above, battery charging circuit 68 supplies power to recharge battery 14, battery 14 providing power for the soldier power management system 64 which in turn powers the soldier carried electronic devices 65 or 18. For the data processing and transfer, data is transferred into and out of the primary inductive data drive circuit via communication data in/out 60 which cooperates with primary data processor driver/receiver 61. The driver side cooperates with a primary data oscillator 85 which in turn cooperates with a primary low power data bridge driver 81 which itself cooperates with the primary data communications coil 80. The receiver side of data processor 61 cooperates with data signal conditioner 62 which in turn cooperates with primary data communications coil 80. Data is transferred via magnetic flux 84 across air gap 21 between primary data communications coil 80 and the corresponding secondary data communications coil 82. On the secondary side, within the secondary inductive data circuit, secondary data communications coil 82 cooperates with both low power data bridge driver 71 and with data signal conditioner 67. Data signal conditioner 67 cooperates with the receiver side of data processor driver/receiver 72. The driver side cooperates with secondary data oscillator 86, which in turn cooperates with low power data bridge driver 71. Secondary side data processor driver/receiver 72 cooperates with data in/out 66 being transferred back and forth between data processor 72 and soldier carried electronic devices 65 or 18.

Although not illustrated in FIGS. 10 and 11, it is understood that the primary and secondary coil assemblies of FIGS. 10 and 11 may employ the various embodiments exemplified by those depicted in FIGS. 5, 7 and 12, wherein the embodiments exemplified by those in FIG. 12 apply to the separate power and data coil pairs of FIG. 11.

In FIG. 5a, flux lines 32 are representative of those characteristic of a primary coil 5 that has an air backing, that is, that does not have ferrite backing, and consequently a weak inductive coupling to secondary coil 6. The encapsulation 31 of the primary and secondary coils, which may as described above, be a flexible or a rigid polymer so as to provide isolation from the surrounding environment, may also be employed to support ferrite backings 35 and 36 behind the primary and secondary coils 5 and 6 respectively. In contradistinction to the air backed coils of FIG. 5a, the ferrite backed coils of FIG. 5b have a characteristic highly concentrated magnetic flux 37 corresponding to the more highly coupled primary and secondary coils so that only a much more limited amount of stray inductance or flux 38 is found.

Figure 8:
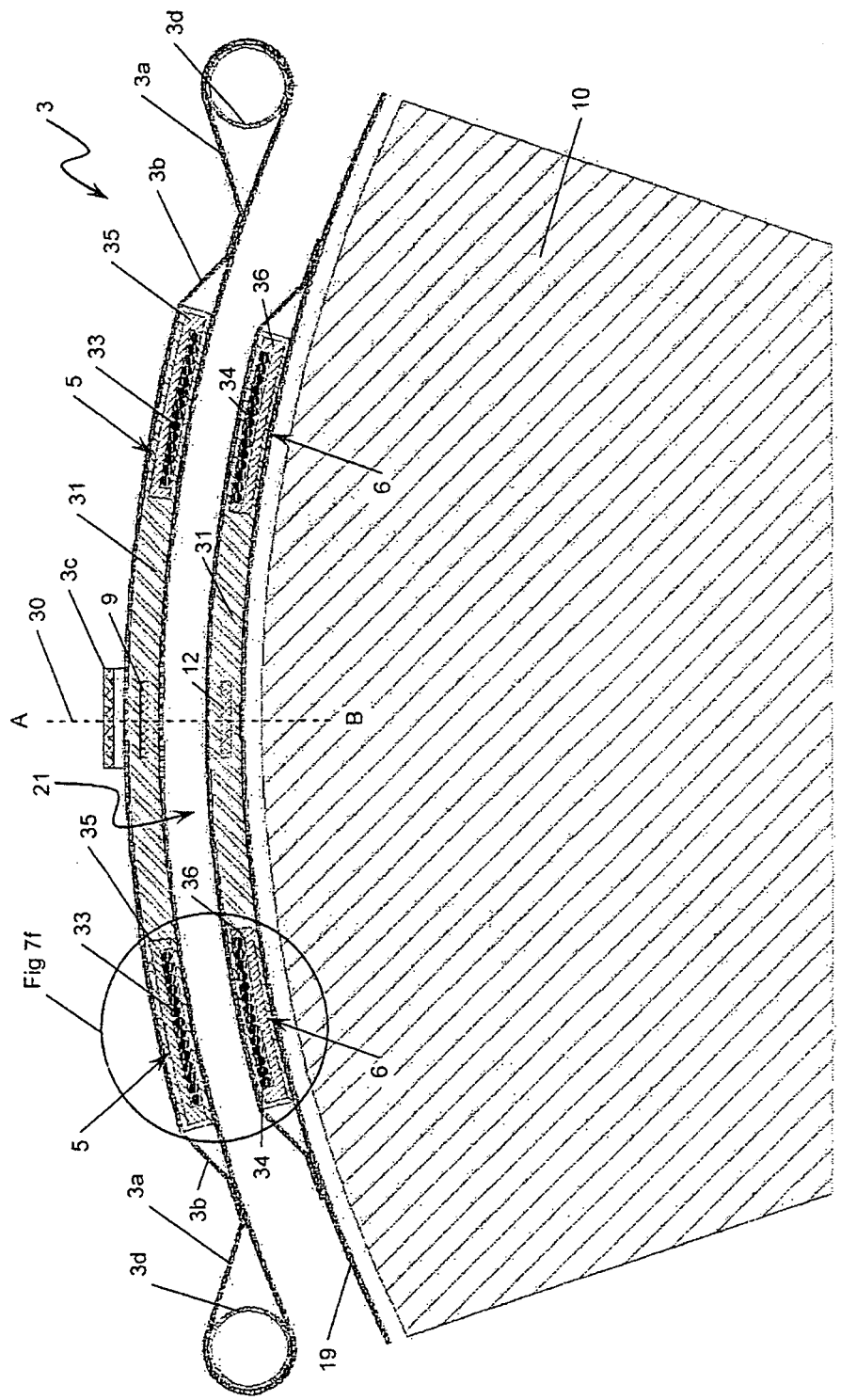
FIG. 8 is a lateral cross-section along line 8-8 in FIG. 9b, showing a of fabric sling seat back formed as a sleeve containing a primary inductive power and data coil assembly with proximity sensor, and a secondary power and data coil integrated into load carriage apparel worn by a soldier and which has been brought into proximity with the primary coil assembly in the seat back.
Figure 9B:
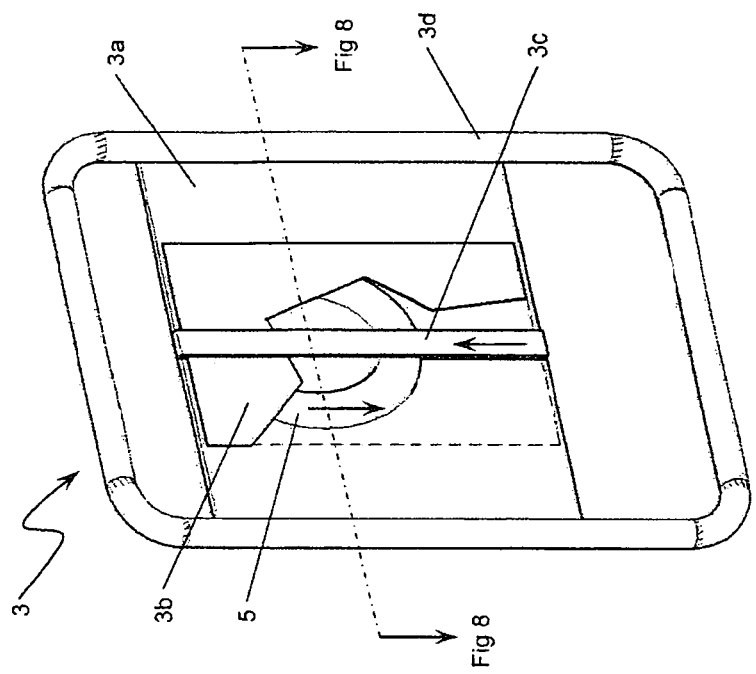
FIG. 9b is the seat back of FIG. 9a wherein the primary coil has been raised and is awaiting lowering by the pulling upwards of the webbing strap.
Figure 9A:
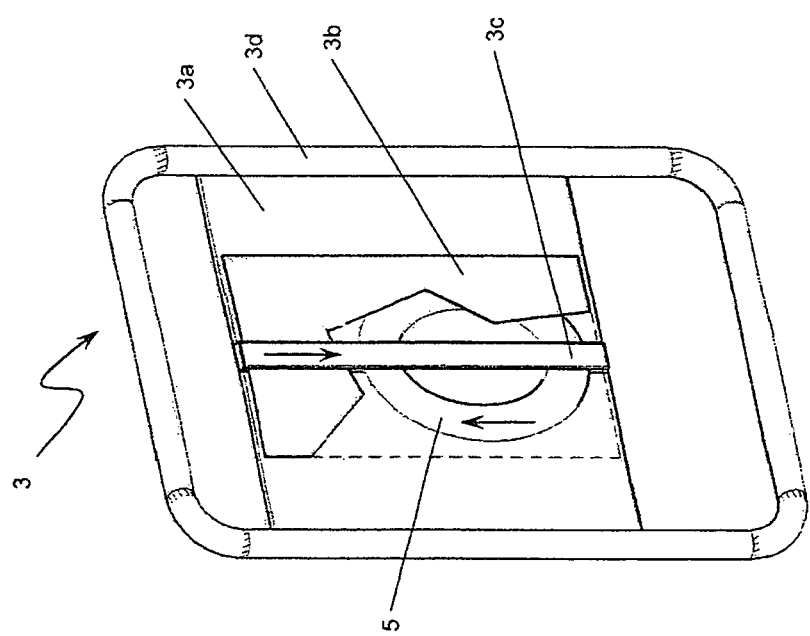
FIG. 9a is, in partially cut-away rear perspective view, the seat back embodiment of FIGS. 8 and 9b wherein the primary coil is in its lowered position awaiting elevation by the pulling downwards of the vertical webbing strap attached in a loop to the primary coil.

FIG. 7a shows a partially cutaway cross-section which corresponds to that of FIG. 5a, that is, where the primary and secondary coils do not have a ferrite backing. FIG. 5b is a partially cutaway cross-section wherein the primary and secondary coils have equal coverage and equal thickness of ferrite backing. FIG. 7b is a further exemplary illustration of the primary and secondary coils, in this case, having reduced coverage ferrite backing as compared to that of FIG. 7c for example. FIG. 7d illustrates the example where ferrite backing 35 is thicker than ferrite backing 36, that is, wherein the primary and secondary coils have equal coverage of ferrite backing but wherein the ferrite backing is thicker behind the primary coil. FIG. 7e illustrates where the primary and secondary coil windings are each centered on a corresponding larger ferrite backing. FIG. 7f, which corresponds to FIG. 8, illustrates the example wherein the primary and secondary coils have windings embedded within corresponding ferrite channels. FIG. 7g illustrates the example wherein the primary and secondary coils have their windings displaced to the radially outer diameter of the ferrite backing, keeping in mind that the illustration of FIG. 7g (and all the others cross sections of FIGS. 7 and 12) is merely a section of one side of the opposed facing pair of primary and secondary coils. FIG. 7h illustrates the exemplary embodiment wherein the primary and secondary coils each overlay a corresponding solid ferrite disc backing.

The partially cutaway section of FIG. 12a which, again, is a section through one side of an opposed facing pair of primary and secondary coils, corresponds to the illustrated embodiment of FIG. 7a. FIG. 12a illustrates that the embodiment of FIG. 10 would not entail a change to the structure of the coils and their encapsulation as compared to that of FIG. 7a. Thus each of the primary and secondary coils are air backed and the inductive data transfer and the inductive power transfer is done through the same primary and secondary coils, or, for example, where the inductive data coil is a sub-coil of the overall inductive power transfer coil, that is, where the inductive data coil may be a tap on the main power coil.

The partially cut away section FIG. 12b illustrates the embodiment of FIG. 10 wherein each of the primary and secondary coils have a ferrite backing ring, that is, the only difference between FIG. 12b and FIG. 12a is that ferrite backing is provided in FIG. 12b.

The partially cutaway section FIG. 12c illustrates a single ferrite backing ring mounted behind each of the primary and secondary coils, and corresponding in coverage to that of FIG. 7c, and wherein a separate data coil is provided for the data transfer, being opposed facing coils 80 and 82 for the primary and secondary sides respectively. The primary and secondary separate data coils each have their own corresponding ferrite rings 87, 88 respectively positioned concentrically within the ferrite rings 35, 36 backing the primary and secondary power transfer coils respectively.

In the example of the partially cutaway section of FIG. 12d, a single ferrite backing ring is provided to back both the power transfer coil and the data transfer coil on both the primary and secondary sides. The inductive data coil on the primary and secondary sides are located concentrically within, and are co-planar with, the power transfer coils. In the embodiment of FIG. 12e, the data transfer coils are radially outermost and co-planar with the concentrically positioned and radially inner power transfer coils. In FIG. 12f the data transfer coils are embedded within the power transfer coils so as to lie radially spaced from central axis 30 with a radius which is no greater than the outside diameter of the power transfer coil and no less than the inside diameter of the power transfer coil. In FIG. 12g single ferrite backing rings are provided for each of the primary and secondary coils, and the inductive data coils are overlaid onto or alternatively sandwiched or interleaved between the primary coils and the corresponding ferrite backing rings.

As with inductive power transfer, inductive data transfer also works within the near field or more specifically the radian sphere. For typical operating frequencies of 13.56 MHz which has a wavelength of 22 m, inductive coupling occurs no further than the near field—far field transition which is approximately defined as $\lambda/2\pi$ (Lambda/2×pi) or a theoretical maximum range of 3.5 m for a 13.56 MHz frequency. In practise because of the low power levels utilised and that the magnetic field attenuates at a rate following the inverse cube law, a practical low power device has a range limit of 1 m. Unlike high power transfer requirements which to be reasonably efficient must be in very close proximity (less than 2-3 cm), inductive data transfer is usually accomplished with power levels of well below 1 watt.

One method that may be employed to establish the inductive data link would be to use near field communication technology (NFC) which uses an inductive link to enable connectivity between devices. A considerable benefit of near field communications (NFC) is that it removes the need for user intervention to establish pairing between devices. Once two NFC devices have been brought within close proximity of several cm to enable pairing, they may then be separated up to as much as 1 m while maintaining continued communication. In practise, the soldier would sit in the seat and by coming within a few centimeters of the seat back, allow the primary and secondary data circuits to handshake and establish a communications link. The soldier is then be able to move around in his seat with practical separation distances of up to 50 cm without breaking the inductive data link. The inductive data link provides a greater latitude of movement for the soldier than when the soldier is connected to a communications data stream via an umbilical cable and connector. In addition the soldier can move around and quickly make, break and remake data links within only a couple of seconds, without having to physically disconnect and reconnect an umbilical cable which as discussed earlier presents considerably more difficulty.

NFC technology was originally developed by Phillips and Sony and is based on the ECMA 340 standard. ECMA 340 specifies a magnetic induction interface operating at 13.56 MHz and with data rates of 106, 212, 424 kbps and if required 848 kbps or higher. The technology was originally developed to transfer data between cell phones themselves, or cell phones and embedded smart tags, data terminals for sale transactions or between computers and other electronics such as TVs or media players.

Its application for data transfer between an occupant and a seat has not been previously envisioned, whereby the occupant connects to the seat's data driver simply by sitting in the seat, the primary and secondary circuits coming within proximity and connecting within preferably 0.1 seconds. The NFC system would be operated in active communication mode (versus passive) where both the primary (initiator) and the secondary (target) can communicate with the other by alternately generating their own inductive data field.

An inductive data communication system that uses the 13.56 MHz frequency range is allowed by national and international communication regulatory agencies such as the FAA or in Europe the European Conference of Postal and Telecommunications Administrations (CEPT) that have set aside specific frequency ranges for applications such as industrial, scientific or medical applications, for very short range devices (SRD), ISM frequency ranges (Industrial-Scientific-Medical) as well as various RFID industry conformance standards and protocols.

Using a minimum of components and a single frequency band the inductive data transfer circuits will be able to support half duplex bidirectional communication. With more elaborate circuitry a wider communication band width it will be able to support full duplex bidirectional communication.

In designing a magnetically coupled data transfer system, one has the choice of implementing any one of a large variety of modulation and encoding formats. Typical modulation methods would use, but are not limited too ASK (Amplitude Shift Keying) or other standard formats and iterations such as FSK (Frequency Shift Keying), OOK (On-Off Keying), PSK (Phase Shift Keying) and DPK (Differential Phase Shift Keyed) etcetera.

Encoding of the data stream could also be performed by many existing methods including but limited too Manchester, Miller, PIE and their variants.

As would be known to one skilled in the art, of the data transmission protocols available, careful evaluation has to be made of the types of protocols used as for example with amplitude modulation. This is because the distance between the primary and secondary will vary for most devices and therefore the amplitude of the signal received by the secondary coil will always be fluctuating in amplitude and may be interpreted as incorrect transmission of data if improper voltage thresholds were to be used.

A significant requirement for inductive data transfer would be that it not interfere with conventional military or civilian radio transmitters and receivers. Again because the inductive coupling according to the present invention is operating in the electro-magnetic frequency spectrum it would not cause interference with devices operating in RF spectrum.

Due to the fact that inductive coupling uses the electromagnetic spectrum it does not interfere with RF communications, nor can it be jammed by RF. Therefore, when in an RF denied area whether to prevent the triggering of IED or otherwise, inductive power and especially inductive communications and data transmission would be unaffected.

As will be apparent to those skilled in the art in the light of the foregoing disclosure, many alterations and modifications are possible in the practice of this invention without departing from the spirit or scope thereof Accordingly, the scope of the invention is to be construed in accordance with the substance defined by the following claims.

What is claimed is:

1. A system for providing a user, while seated in a vehicle seat in a vehicle, with electrical power and data communication without the use of a physical electrical connection between the user and the seat or vehicle, the system comprising:
   a) a vehicle seat having a seat surface engaging the user while seated in said seat, and having a first inductive coil assembly having a first inductive coil mounted immediately behind said seat surface, said seat adapted to be mounted in a vehicle,
   b) apparel having therein a second inductive coil assembly having a corresponding second inductive coil, said apparel adapted to be worn by a user,
   c) first electronics adapted for mounting in the vehicle and cooperating with said first inductive coil assembly, wherein said first electronics is a first charging and controlling circuit adapted to energize and modulate a first inductive coil of said first inductive coil assembly, said first inductive coil adapted to transfer power and data to a second inductive coil of said second inductive coil assembly solely via inductive coupling between said first and second inductive coils,
   d) second electronics on said apparel and cooperating with said second inductive coil assembly, wherein said second electronics is a second charging and control circuit,
   e) at least one main battery assembly adapted for wearing by the user, said at least one main battery assembly including at least one main battery and adapted for charging of said at least one main battery by said second electronics upon said inductive coupling between said first and second inductive coils when energized,
wherein power is transferred solely via said inductive coupling for said energizing and said charging from said first electronics to said second electronics and data is transferred via said modulations for data communications between said first and second electronics.

2. The system of claim 1 wherein said apparel is torso-covering apparel, said first inductive coil is on a seat back of said seat, and said second inductive coil is located on a back portion of said torso-covering apparel.

3. The system of claim 2 wherein said first inductive coil is selectively positionable on said seat back to correlate the position of said first inductive coil with the location of said second inductive coil on said back portion of said apparel.

4. The system of claim 2 wherein said seat back is flexible and wherein said first inductive coil is at least in part correspondingly flexible.

5. The system of claim 4 wherein said first inductive coil is segmented to provide said flexibility.

6. The system of claim 4 wherein said second inductive coil is flexible for conformal, parallel alignment of said first and second inductive coils when said user is sitting in said seat with said back portion of said apparel against said seat back.

7. The system of claim 2 wherein said seat back is flexible and wherein said first inductive coil is contoured so as to conform in shape to the user's torso.

8. The system of claim 1 further comprising:
electrically powered small devices for carrying by the user in inductively coupled proximity to said apparel, said small devices having secondary batteries for electrical operation of said small devices, said apparel having at least one small device charging primary inductive coil,
wherein said small devices include secondary coils positioned and adapted for charging of said secondary batteries when said secondary coils are in charging proximity to said small device charging primary inductive coil,
and wherein said small device charging primary inductive coil is positioned on said apparel so as to transfer electrical power to said secondary coils when corresponding said small devices are carried by said user and said small device charging primary inductive coil is energized.

9. The system of claim 3 further comprising a sleeve having said first inductive coil mounted therein and wherein said sleeve is sized to fit over said seat back.

10. The system of claim 9 further comprising a hoist in said sleeve, wherein said hoist is mounted to said first inductive coil, and wherein said hoist is adapted to selectively vertically position said first inductive coil.

11. The system of claim 1 wherein said first inductive coil assembly includes a plurality of said first inductive coils mounted to said seat, and wherein said first electronics includes a plurality of said first electronics corresponding to and cooperating with said plurality of said first inductive coils, and wherein said second inductive coil assembly includes a corresponding plurality of said second inductive coils positioned to correspond to said plurality of said first inductive coils.

12. The system of claim 1 further comprising encapsulating said first and second inductive coils each within an environmentally resistant encapsulation.

13. The system of claim 12 wherein said encapsulation is polymer encapsulation and wherein said, environmentally resistant encapsulation is water-proof.

14. The system of claim 1 wherein said inductive coupling forms an air core between said first and second inductive coils, and wherein said inductive coils each have a ferrite backing.

15. The system of claim 14 wherein said ferrite backing is positioned relative to said coils so as to increase inductive efficiency within said inductive coupling by minimizing stray flux and increasing flux density across said air core.

16. The system of claim 1 wherein said seat includes a metal frame and wherein said first electronics is mounted to said metal frame so as to provide a heat sink for said first electronics.

17. The system of claim 1 wherein said second electronics is mounted adjacent said second inductive coil.

18. The system of claim 17 wherein said second electronics is mounted within said second inductive coil, and so as to be co-planar therewith.

19. The system of claim 1 further comprising a proximity sensor cooperating between said first and second inductive coils so that a coupling proximity of said first inductive coil to said second inductive coil so as to allow said inductive coupling is detected by said proximity sensor and wherein said proximity sensor is adapted to communicate a trigger to said first electronics upon said coupling proximity.

20. The system of claim 19 wherein said first electronics is adapted to only said energize said first inductive coil upon said trigger.

21. The system of claim 1 wherein said at least one main battery assembly includes a battery charging and control circuit adapted to monitor charging required by said at least one main battery and to correspondingly charge said at least one main battery as required upon said inductive coupling, and wherein if said battery charging and control circuit determines no charging of said at least one main battery is required then a corresponding battery status is communicated to said first electronics and said power transfer via said inductive coupling is terminated by said first electronics.

22. The system of claim 21 wherein said first electronics is adapted to interrogate said second electronics upon said inductive coupling to determine said charging required by said at least one main battery.

23. The system of claim 19 wherein said proximity sensor includes a first element adjacent said first inductive coil and a second element adjacent said second inductive coil, wherein said first and second elements cooperate to generate said trigger.

24. The system of claim 23 wherein said first element is a hall effect sensor and said second element is a magnet.

25. The system of claim 1 wherein said first and second inductive coils include, respectively: a first power transfer coil and a separate first data transfer coil; and, a second power transfer coil and a separate second data transfer coil.

26. The system of claim 25 wherein said first and second data transfer coils are embedded in, respectively, said first and second power transfer coils.

27. The system of claim 25 wherein said first and second inductive coils each have a ferrite backing and wherein said first and second data transfer coils are interleaved with said first and second power transfer coils and said ferrite backings.

28. The system of claim 25 wherein said first and second data transfer coils are non-concentric with said first and second power transfer coils respectively.

29. The system of claim 28 wherein said first and second data transfer coils are spaced apart from said first and second power transfer coils respectively.

30. The system of claim 29 wherein said first power transfer coil and said first data transfer coil are co-planar.

\* \* \* \* \*